(12) United States Patent
Piechotta et al.

(10) Patent No.: US 11,349,623 B2
(45) Date of Patent: May 31, 2022

(54) RELIABLE AND LOW-LATENCY TRANSMISSION OF DATA VIA A VOICE CHANNEL IN A COMMUNICATION NETWORK

(71) Applicant: Fraunhofer-Gesellschaft zur Förderung der angewandten Forschung e.V., Munich (DE)

(72) Inventors: Tom Piechotta, Berlin (DE); Kim Mahler, Berlin (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 0 days.

(21) Appl. No.: 16/807,852

(22) Filed: Mar. 3, 2020

(65) Prior Publication Data

US 2020/0204326 A1 Jun. 25, 2020

Related U.S. Application Data

(63) Continuation of application No. PCT/EP2018/075045, filed on Sep. 17, 2018.

(30) Foreign Application Priority Data

Sep. 18, 2017 (EP) .................................. 17191609

(51) Int. Cl.
*H04L 5/00* (2006.01)
*H04L 27/26* (2006.01)
(Continued)

(52) U.S. Cl.
CPC .......... *H04L 5/0053* (2013.01); *H04L 5/0007* (2013.01); *H04L 27/2602* (2013.01);
(Continued)

(58) Field of Classification Search
CPC ............................. H04M 1/253; H04M 11/066
See application file for complete search history.

(56) References Cited

U.S. PATENT DOCUMENTS

| 5,537,436 A | 7/1996 | Bottoms et al. |
| 2003/0219068 A1 | 11/2003 | Smith |

(Continued)

FOREIGN PATENT DOCUMENTS

| EP | 0631421 A1 | 12/1994 |
| EP | 1520385 A1 | 4/2005 |

(Continued)

OTHER PUBLICATIONS

Rami Abu-Alhiga et al., "Subcarrier-index modulation OFDM, Personal, Indoor and Mobile Radio Communications", 2009 IEEE 20th International Symposium on, Sep. 13, 2009, pp. 177-181.
(Continued)

*Primary Examiner* — Ayaz R Sheikh
*Assistant Examiner* — Debebe A Asefa
(74) *Attorney, Agent, or Firm* — Novick, Kim & Lee, PLLC; Jae Youn Kim; Jihun Kim

(57) ABSTRACT

Methods and apparatuses for providing control signals for a transmission from a transmitting device to a receiving device using a mobile communication connection that comprises a voice channel are described. The control signals are used for controlling the operation of the receiving device.

28 Claims, 16 Drawing Sheets

(51) Int. Cl.
*H04L 27/30* (2006.01)
*H04W 16/14* (2009.01)
*H04W 28/02* (2009.01)

(52) U.S. Cl.
CPC .......... *H04L 27/2628* (2013.01); *H04L 27/30* (2013.01); *H04W 16/14* (2013.01); *H04W 28/0263* (2013.01)

(56) References Cited

U.S. PATENT DOCUMENTS

| | | | |
|---|---|---|---|
| 2004/0001429 A1 | 1/2004 | Ming et al. | |
| 2008/0280569 A1 | 11/2008 | Hazani et al. | |
| 2009/0249407 A1* | 10/2009 | Manne | H04M 1/72409 |
| | | | 725/68 |
| 2010/0246786 A1 | 9/2010 | Binder | |
| 2011/0275352 A1 | 11/2011 | Yin et al. | |
| 2012/0106657 A1 | 5/2012 | Fischer et al. | |
| 2012/0250637 A1 | 10/2012 | Taha et al. | |
| 2013/0272463 A1 | 10/2013 | Uyehara et al. | |
| 2014/0101054 A1* | 4/2014 | Yehudai | G06Q 20/322 |
| | | | 705/64 |
| 2014/0105263 A1* | 4/2014 | Geile | H04L 27/2608 |
| | | | 375/222 |

FOREIGN PATENT DOCUMENTS

| | | |
|---|---|---|
| JP | H07-99512 | 4/1995 |
| JP | 2001-148678 A | 5/2001 |
| JP | 2003-244091 A | 8/2003 |
| JP | 2011-518484 A | 6/2011 |
| JP | 2013-504916 A | 2/2013 |
| KR | 1020070011559 A | 1/2007 |
| KR | 1020100022538 A | 3/2010 |
| KR | 1020130103683 A | 9/2013 |
| KR | 1020140089614 A | 7/2014 |
| WO | 2004004269 A1 | 1/2004 |

OTHER PUBLICATIONS

Syogo Fukuda, "Office Action for JP Application No. 2020-515876", dated Jul. 12, 2021, JPO, Japan.

Kazuaki Yoshie, "Office Action for JP Application No. 2020-515876", dated Mar. 14, 2022, JPO, Japan.

* cited by examiner

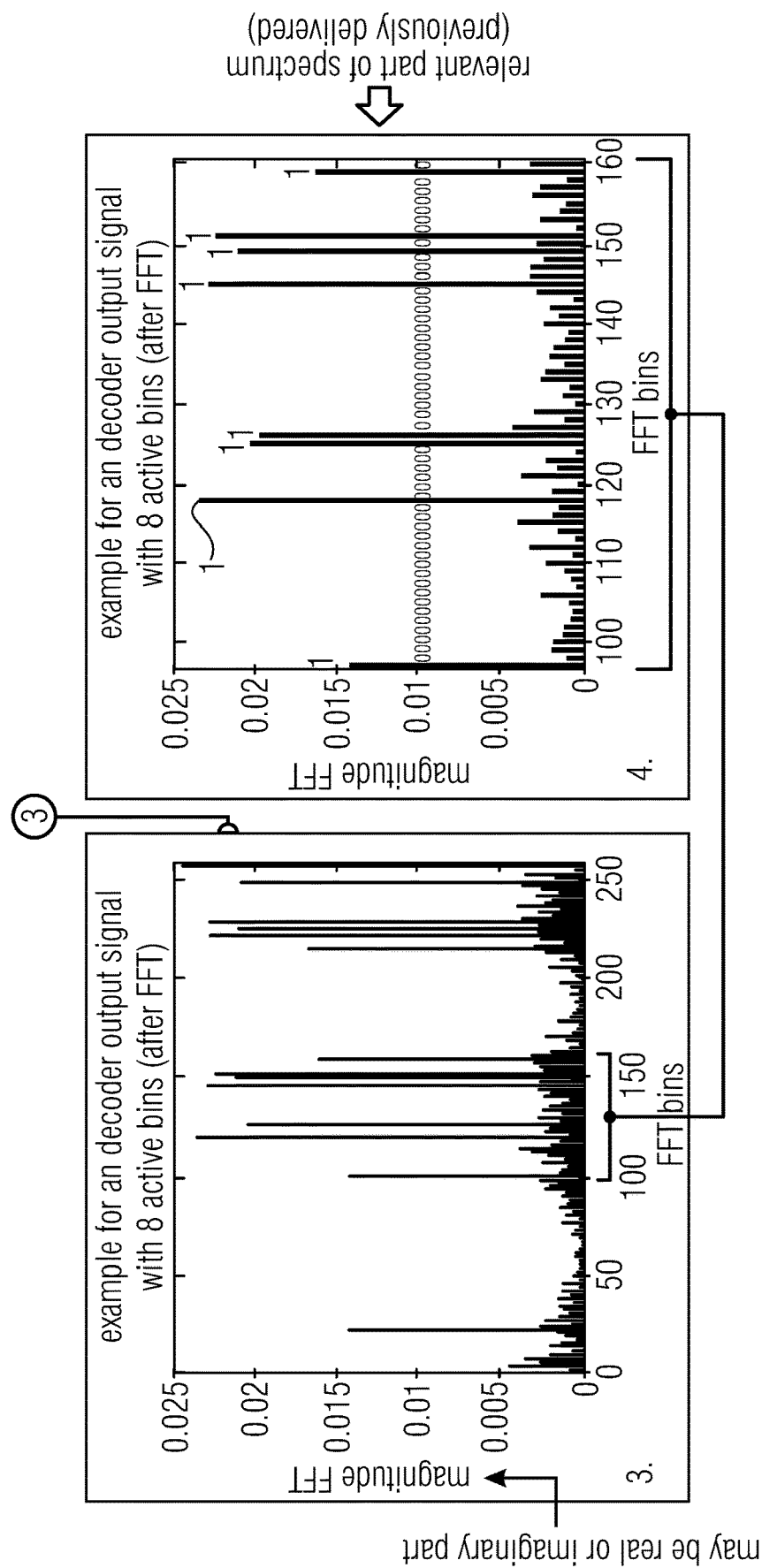

RELIABLE AND LOW-LATENCY TRANSMISSION OF DATA VIA A VOICE CHANNEL IN A COMMUNICATION NETWORK

CROSS-REFERENCE TO RELATED APPLICATIONS

This application is a continuation of copending International Application No. PCT/EP2018/075045, filed Sep. 17, 2018, which is incorporated herein by reference in its entirety, and additionally claims priority from European Application No. EP 17191609.1, filed Sep. 18, 2017, which is also incorporated herein by reference in its entirety.

The present invention relates to the field of communication networks or systems, more specifically to the transmission of data in such communication networks. Embodiments of the present invention concern an improved transmission of data over a wireless communication resource.

BACKGROUND OF THE INVENTION

FIG. 1 is a schematic representation of an example of a wireless network 100 including a core network 102 and a radio access network 104. The radio access network 104 may include a plurality of base stations $eNB_1$ to $eNB_5$, each serving a specific area surrounding the base station schematically represented by respective cells $106_1$ to $106_5$. The base stations are provided to serve users within a cell. A user may be a stationary device or a mobile device. Further, the wireless communication system may be accessed by mobile or stationary "Internet of Things" (IoT) devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items having embedded therein electronics, software, sensors, actuators, or the like as well as network connectivity that enable these devices to collect and exchange data across an existing network infrastructure. FIG. 1 shows an exemplary view of only five cells, however, the wireless communication system may include more such cells. FIG. 1 shows two users UE1 and UE2, also referred to as user equipment (UE), that are in cell $106_2$ and that are served by base station $eNB_2$. Another user $UE_3$ is shown in cell $106_4$ which is served by base station $eNB_4$. The arrows $108_1$, $108_2$ and $108_3$ schematically represent uplink/downlink connections for transmitting data from a user $UE_1$, $UE_2$ and $UE_3$ to the base stations $eNB_2$, $eNB_4$ or for transmitting data from the base stations $eNB_2$, $eNB_4$ to the users $UE_1$, $UE_2$, $UE_3$. Further, FIG. 1 shows two IoT devices $110_1$ and $110_2$ in cell $106_4$, which may be stationary or mobile devices. The IoT device $110_1$ accesses the wireless communication system via the base station $eNB_4$ to receive and transmit data as schematically represented by arrow $112_1$. The IoT device $110_2$ accesses the wireless communication system via the user $UE_3$ as is schematically represented by arrow $112_2$. The respective base station $eNB_1$ to $eNB_5$ are connected to the core network 102 via respective backhaul links $114_1$ to $114_5$, which are schematically represented in FIG. 1 by the arrows below the eNBs. The core network 102 may be connected to one or more external networks (not shown).

For data transmission a physical resource grid may be used. The physical resource grid may comprise a set of resource elements to which various physical channels and physical signals are mapped. For example, the physical channels may include the physical downlink and uplink shared channels (PDSCH, PUSCH) carrying user specific data, also referred to as downlink and uplink payload data, the physical broadcast channel (PBCH) carrying for example a master information block (MIB) and a system information block (SIB), the physical downlink and uplink control channels (PDCCH, PUCCH) carrying for example the downlink control information (DCI), etc. For the uplink, the physical channels may further include the physical random access channel (PRACH or RACH) used by UEs for accessing the network once a UE synchronized and obtained the MIB and SIB. The physical signals may comprise reference signals (RS), synchronization signals and the like. The resource grid may comprise a frame having a certain duration, like 10 milliseconds, in the time domain and having a given bandwidth in the frequency domain. The frame may have a certain number of subframes of a predefined length, e.g., 2 subframes with a length of 1 millisecond. Each subframe may include two slots of 6 or 7 OFDM symbols depending on the cyclic prefix (CP) length.

The wireless communication system may be any single-tone or multicarrier system based on frequency-division multiplexing, like the orthogonal frequency-division multiplexing (OFDM) system, the orthogonal frequency-division multiple access (OFDMA) system, or any other Inverse Fast Fourier Transform, IFFT,-based signal with or without CP, e.g., DFT-s-OFDM. Other waveforms, like non-orthogonal waveforms for multiple access, e.g., filter-bank multicarrier (FBMC), generalized frequency division multiplexing (GFDM) or universal filtered multi carrier (UFMC), may be used. The wireless communication system may operate, e.g., in accordance with the LTE-Advanced pro standard or the 5G or NR (New Radio) standard.

In wireless communication networks as described above with reference to FIG. 1, the uplink transmission may be scheduled by an access point (AP), like a base station, using a request-grant procedure, i.e., the mobile device or user sends a scheduling request (SR) to the AP during a registration procedure. Then the AP performs scheduling to grant resources to users in a centralized manner. The request-grant procedure, i.e., the initial association of a user to the wireless communication network is performed in a contention based manner. The same mechanism may be used to reestablish a connection between the user and the AP upon a connection failure. A conventional contention-based random access procedure may include four steps, and FIG. 2 is a signaling diagram for a successful contention-based random access procedure as it is described, e.g., in reference [1]. Initially a preamble is transmitted by the user, UE, to the access point, eNB. Upon detection of the preamble by the eNB, a random access response is transmitted followed by two further messages, the L2/L3 message from UE to the eNB and a message, if needed, for early contention resolution from the eNB to the UE. However, in case the eNB does not detect the preamble, a timeout occurs at the UE, and the UE transmits a further random access sequence of the same preamble format again.

In the presence of a massive number of devices sporadically accessing the system, the contention-based random access procedure may be associated with a sharp degradation in performance and large access delays, rendering the communication impractical. For example, currently implemented access mechanisms may not be capable of managing the access requests from hundreds or thousands of devices in a time-constraint system.

The above mentioned "Internet of Things" facilitates the interconnection of objects. Most of these objects do not have a physical connection to the internet and have to be connected using WLAN and/or mobile communication technology. The radius of coverage of WLAN is limited, and mobile internet is in many regions not or only insufficiently, available. Network overload may lead to a strong reduction of the data rate, may lead to large latency or even may cause the failure of the communication link. A reliable and continuously available communication with mobile devices and/or machines like vehicles, sensors or unmanned aerial vehicles, UAVs, may not be guaranteed for the before mentioned reasons.

In particular, the integration of UAVs in the available radio network infrastructure could facilitate remote controlling and monitoring of unmanned air traffic via the mobile internet.

In particular, in logistics, there are promising pilot projects regarding the usage of UAVs, these are limited to regions with weak infrastructures. The reason is that during an autonomous flight, control signals cannot be exchanged with the UAV to control the UAV in particular situations, e.g., sending correcting control signals or taking over the control by a pilot remotely. Commercially available radio controls have a range of coverage of only up to a few kilometers, e.g., using WLAN or radio systems. Cellular radio systems like 3G or 4G/LTE do not come into question because their coverage may be in most cases incomplete.

Presently, transport means like e.g. UAVs that transport goods are operating autonomously, and the ground station has no knowledge of their position and has no possibility of intervening. This is a workaround when coverage is not sufficient with the drawback of missing possibility of directly controlling these transport means.

Based on the before mentioned drawbacks, a new and more reliable technique for controlling is desired.

SUMMARY

According to an embodiment, a method for providing control signals for a transmission from a transmitting device to a receiving device using a mobile communication connection between the transmitting device and the receiving device, wherein the mobile communication connection includes a voice channel may have the steps of: providing user data, at the transmitting device, the user data including the control signals, the control signals being used for controlling an operation of the receiving device; and mapping, at the transmitting device, the user data on a predetermined number of frequencies of a frequency spectrum of the voice channel of the mobile communication connection.

According to another embodiment, a method for controlling an operation of a receiving device via a mobile communication connection between a transmitting device and the receiving device, the mobile communication connection including a voice channel, may have the steps of: receiving, at the receiving device, a frequency spectrum, the frequency spectrum including a predetermined number of frequencies of a frequency spectrum of the voice channel of the mobile communication connection, wherein control signals for controlling the operation of the receiving device are mapped to the predetermined number of frequencies; performing, at the receiving device, a demapping of the frequency spectrum to acquire the control signals; and controlling the receiving device based on the acquired control signals.

According to another embodiment, a method for a control system, the control system including a transmitting device, a receiving device and a mobile communication connection between the transmitting device and the receiving device, may have the steps of: providing control signals from the transmitting device to the receiving device according to the method for providing control signals for a transmission from a transmitting device to a receiving device using a mobile communication connection between the transmitting device and the receiving device, wherein the mobile communication connection includes a voice channel, the method having the steps of: providing user data, at the transmitting device, the user data including the control signals, the control signals being used for controlling an operation of the receiving device; and mapping, at the transmitting device, the user data on a predetermined number of frequencies of a frequency spectrum of the voice channel of the mobile communication connection; and controlling an operation of the receiving device according to the method for controlling an operation of a receiving device via a mobile communication connection between a transmitting device and the receiving device, the mobile communication connection including a voice channel, the method having the steps of: receiving, at the receiving device, a frequency spectrum, the frequency spectrum including a predetermined number of frequencies of a frequency spectrum of the voice channel of the mobile communication connection, wherein control signals for controlling the operation of the receiving device are mapped to the predetermined number of frequencies; performing, at the receiving device, a demapping of the frequency spectrum to acquire the control signals; and controlling the receiving device based on the acquired control signals.

Another embodiment may have a non-transitory digital storage medium having a computer program stored thereon to perform the method for providing control signals for a transmission from a transmitting device to a receiving device using a mobile communication connection between the transmitting device and the receiving device, wherein the mobile communication connection includes a voice channel, the method having the steps of: providing user data, at the transmitting device, the user data including the control signals, the control signals being used for controlling an operation of the receiving device; and mapping, at the transmitting device, the user data on a predetermined number of frequencies of a frequency spectrum of the voice channel of the mobile communication connection, when said computer program is run by a computer.

According to another embodiment, a transmitting device for providing control signals for a transmission from the transmitting device to a receiving device using a mobile communication connection between the transmitting device and the receiving device, the mobile communication connection including a voice channel, may have: a controller adapted to provide user data, the user data including the control signals, the control signals being used for controlling an operation of the receiving device; and a mapper adapted to map the user data on a predetermined number of frequencies of a frequency spectrum of the voice channel of the mobile communication connection.

According to another embodiment, a receiving device for controlling an operation of the receiving device via a mobile communication connection between a transmitting device and the receiving device, the mobile communication connection including a voice channel, may have: a receiver adapted to receive a frequency spectrum, the frequency spectrum including a predetermined number of frequencies of a frequency spectrum of the voice channel of the mobile communication connection, wherein control signals for controlling the operation of the receiving device are mapped to the predetermined number of frequencies; a demapper adapted to perform a demapping of the frequency spectrum to acquire the control signals; and a controller adapted to control the receiving device based on the acquired control signals.

Another embodiment may have a system including an inventive transmitting device, an inventive receiving device and a mobile communication connection between the transmitting device and the receiving device.

According a first embodiment, a method for providing control signals from a transmitting device to a receiving device using a mobile communication connection between the transmitting device and the receiving device is provided, wherein the communication connection comprises a voice channel, the method comprising providing user data, at a transmitting device, the user data comprising the control signals that are used for controlling an operation of the receiving device, and mapping the user data at the transmitting device on a predetermined number of frequencies of a frequency spectrum of the voice channel of the mobile communication connection. This technique has the advantage that control signals can be transmitted with low latency because, with the communication connection including a voice channel, a low latency connection is used. The transmission is performed with high efficiency as only a predetermined number of frequencies are used which facilitates a robust transmission of the data.

In a second embodiment, the frequencies used correspond to integer multiples of a base frequency. This has the advantage that the data transmission can be performed very efficient because restricting the frequency spectrum to integer multiples of a base frequency allows using very efficient fast Fourier transform algorithms.

In a third embodiment, the predetermined number of frequencies comprises a subset of frequencies that comprises at least one frequency up to a maximum number of available frequencies. This has the advantage that a combination of frequencies can be picked that provides an optimum data transmission efficiency.

In a fourth embodiment, the maximum number of available frequencies is smaller than an integer number corresponding to a quotient of a frequency range of the voice channel divided by the base frequency.

In a fifth embodiment, the user data comprises a plurality of data elements, and the mapping comprises signing each data element to a unique combination of frequencies. This has the advantage that the user data is mapped to a combination of frequencies in a one-to-one manner leading to bijective correspondence such that a translation between the combination of frequencies and the user data can be performed efficiently.

In a sixth embodiment, the assigning of the data elements into the combination of frequencies is based on a codebook. Using a codebook provides a very efficient mapping between data elements and frequencies without involving strong computational power.

In a seventh embodiment, the frequency spectrum is transmitted from the transmitting device to receiving device. In particular, the transmitting is performed as time signal, that means a signal in the time space, not the frequency domain.

In an eighth embodiment, the same frequency spectrum is repeatedly or continuously transmitted until a change of the user data occurs. This has the advantage that if one transmission of the frequency spectrum is corrupted, this may not affect the transmission because in a later frame, the same data is retransmitted and the information can be obtained from the later transmission. Further, this allows that a corrupted frame can be discarded without losing information.

According to a ninth embodiment, a method for controlling an operation of a receiving device via a mobile communication connection, which comprises a voice channel, between a transmitting device and the receiving device, wherein the method comprises receiving, at the receiving device, a frequency spectrum comprising a predetermined number of frequencies of a frequency spectrum of the voice channel of the mobile communication connection, wherein control signals for controlling the operation of the receiving device are mapped to the predetermined number of frequencies, performing, at the receiving device, a de-mapping of the frequency spectrum to obtain the control signals, and controlling the receiving device based on the obtained control signals. This has the advantage that the operation of the receiving device can be controlled without latency because a voice channel, like e.g. a circuit switched mobile communication connection, is a low latency connection.

According to a tenth embodiment, the receiving device comprises a codebook that assigns unique combinations of frequencies to respective control signals. This has the advantage that an effective mapping between frequency combinations and control signals is provided that involves only a small computational effort.

According to an eleventh embodiment, the frequency spectrum is received as a frame, e.g., as a time frame, and a frame is discarded in the case that the frame contains a number of frequencies that is not equal to a predetermined number of frequencies. This has the advantage that a corrupted frame can be easily recognized based on a certain criterion and then be discarded.

According to a twelfth embodiment, a Fourier transform, FT, is performed at the receiving device on the frequency spectrum to obtain a FT spectrum, and amplitudes of peaks of the FT spectrum are extracted at the receiving device at frequencies that correspond to integer multiples of the base frequency. This has the advantage that the peaks can be easily located, because they have to be at integer multiples of the base frequency, hence yielding to a fast and efficient de-mapping. Further, as very efficient Fast Fourier Transform, FFT, algorithms are known, the described technique provides an effective control method involving low computational effort.

According to a thirteenth embodiment, the frequencies of the extracted amplitudes are translated at the receiving device into control signals using a codebook. This has the advantage that the translation between frequencies and control signals can be performed with a reduced computational effort because the mapping based on the codebook can be performed very fast and efficiently.

According to a fourteenth embodiment, the base frequency corresponds to a frequency resolution of the fast Fourier transform.

According to a fifteenth embodiment, a control system is provided that operates according to one of the embodiments 1 to 8, and controls the operation of the receiving device according to one of the embodiments 9 to 14.

According to a sixteenth embodiment, a computer program product is provided that, when executed on a computer, causes the computer to perform a method according to one of embodiments 1 to 15.

According to a seventeenth embodiment, a transmitting device is provided that operates according to one of embodiments 1-8.

According to an eighteenth embodiment, a receiving device is provided that operates according to one of the embodiments 9-14.

BRIEF DESCRIPTION OF THE DRAWINGS

Embodiments of the present invention will be detailed subsequently referring to the appended drawings, in which.

DETAILED DESCRIPTION OF THE INVENTION

For the above discussed problems, no solutions presently exists that provide for a wide-ranging and interruption free remote control of objects such as, for example, UAVs. One exception is the remote control via a satellite link, like for example, military drones, which may be controlled from any location.

In areas with good coverage by e.g. an LTE service, the LTE network may be used, in case that such network is not available, only conventional remote controls with limited range or an autonomous or semi-autonomous operation are possible.

The present invention focuses on using mobile communication connections that usually carry voice, such as circuit switched connections in GSM or UMTS systems or packet switched connections for LTE systems. Voice signals are usually transmitted via mobile communication very reliably, with good coverage and with low latency (smaller than 200 ms). The latency of voice signals in the GSM network is, for example, significantly smaller when compared to using a data channel.

One reason for this is that speech is usually transmitted without automatic repeat requests, ARQs. Also, voice connections usually provide a high quality of service, QoS. The reliability of voice connections is based, for example, on these being circuit switched connections (end-to-end connections) in the GSM network. The load of a base station has, hence, no influence on the quality of the connection, because the resources assigned to voice connections has to fulfill all requirements of a GSM voice connection regarding data rate, latency, etc.

These properties facilitate a reliable, real-time connection with virtually unlimited coverage, what is advantageous for many applications.

These advantageous properties of the GSM network may be used for control of machines, measurement data queries or position queries in real time. For this, the data or control signals have to be mapped onto the frequency spectrum of the voice channel (300 Hz to 3400 Hz). To reduce latency to a minimum, a communication protocol may be built on this virtual medium which makes no use of ARQs. The transmitter has, in this case, no knowledge as to whether or not a sent data word has been received by the receiving device.

The reliability of the transmission may be ensured by sending the present data/data word continuously until it changes.

Figure 1:
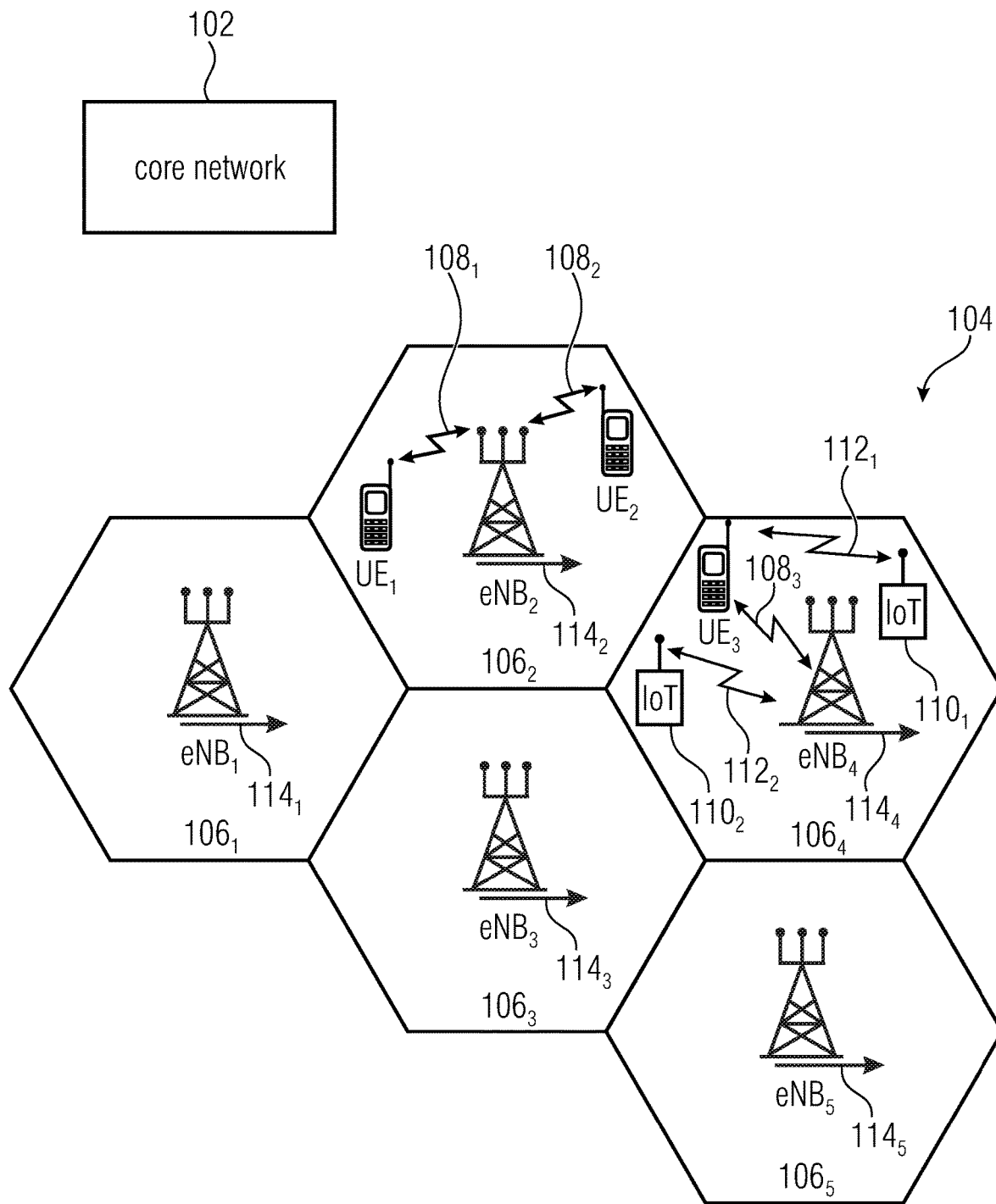
FIG. 1 shows a schematic representation of an example of a wireless communication system.
Figure 2:
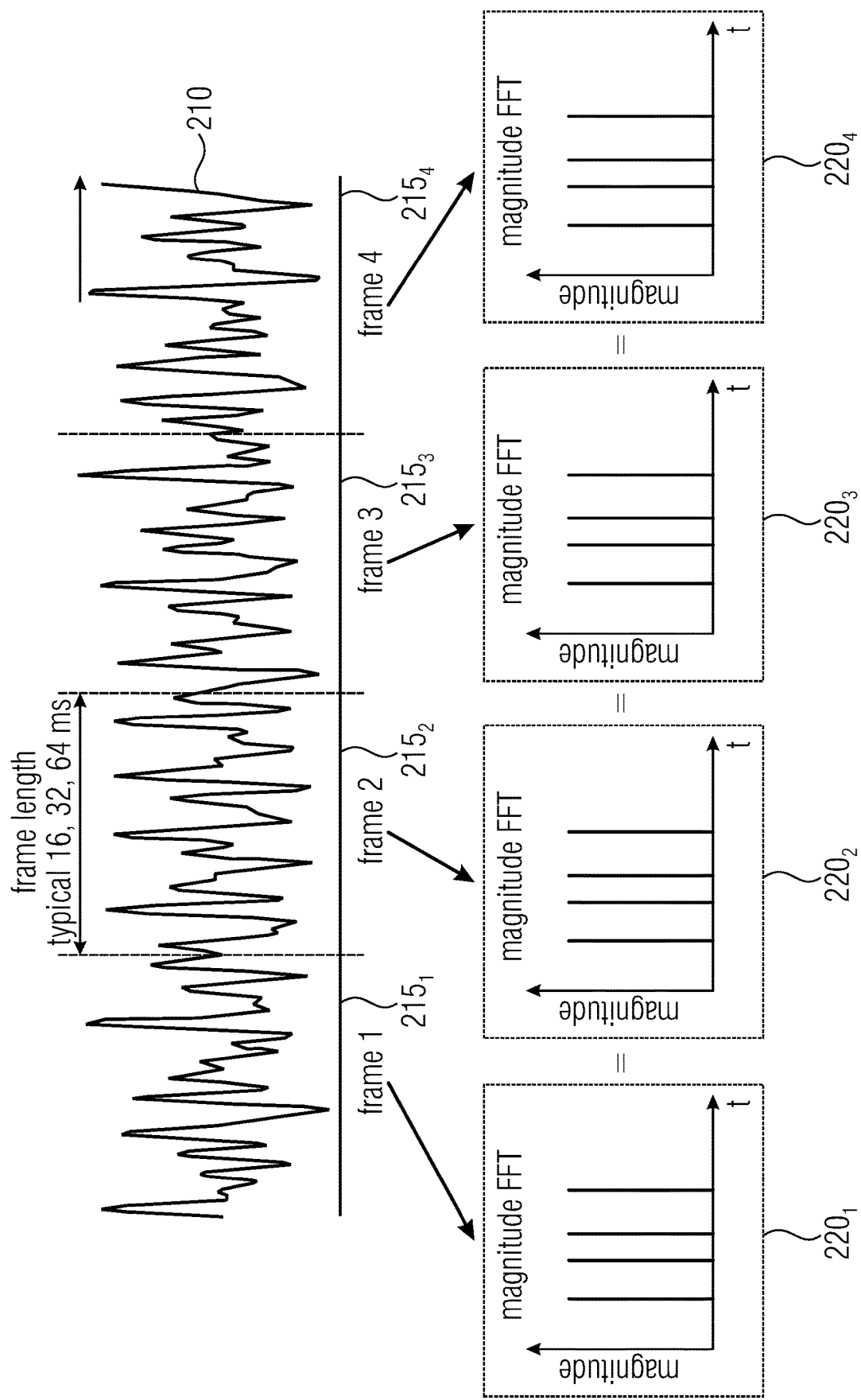
FIG. 2 shows a spectrum of an audio signal consisting of a number of frames according to an embodiment of the invention.

This procedure is depicted in FIG. 2 where a continuous audio signal 210 carrying data is shown. FIG. 2 shows the spectra of the audio signal 210, the signal consisting of a number of frames, in this case four frames $215_1$ to $215_4$ and hence four frequency spectra $220_1$ to $220_4$ are shown. Each of the frames comprises, independently of the respective phase, the same information in the form of the characteristic spectrum. The length of a frame is typically 16, 32 or 62 ms, but may also have any other duration.

In case that the audio signal is corrupted, or the connection is interrupted, such that the spectrum of one or more frames is distorted, the frames in question may be discarded and the information may be taken from the next intact frame. If one frame is corrupted, the latency of the data transmission increases by the length of the frame.

The information that has to be transmitted is inherently contained in the audio spectrum. For this, it is used that an integer multiple of the frequency resolution is mapped exactly onto nodes or grid points of a FT spectrum. The term 'node' or 'grid point refers' to frequencies corresponding to multiples of the frequency resolution of the Fourier transform. The Fourier transform used may be implemented in different ways, for example a fast Fourier transform for which fast and efficient algorithms are known, the resulting frequency spectrum may be a discrete Fourier spectrum.

Figure 3:
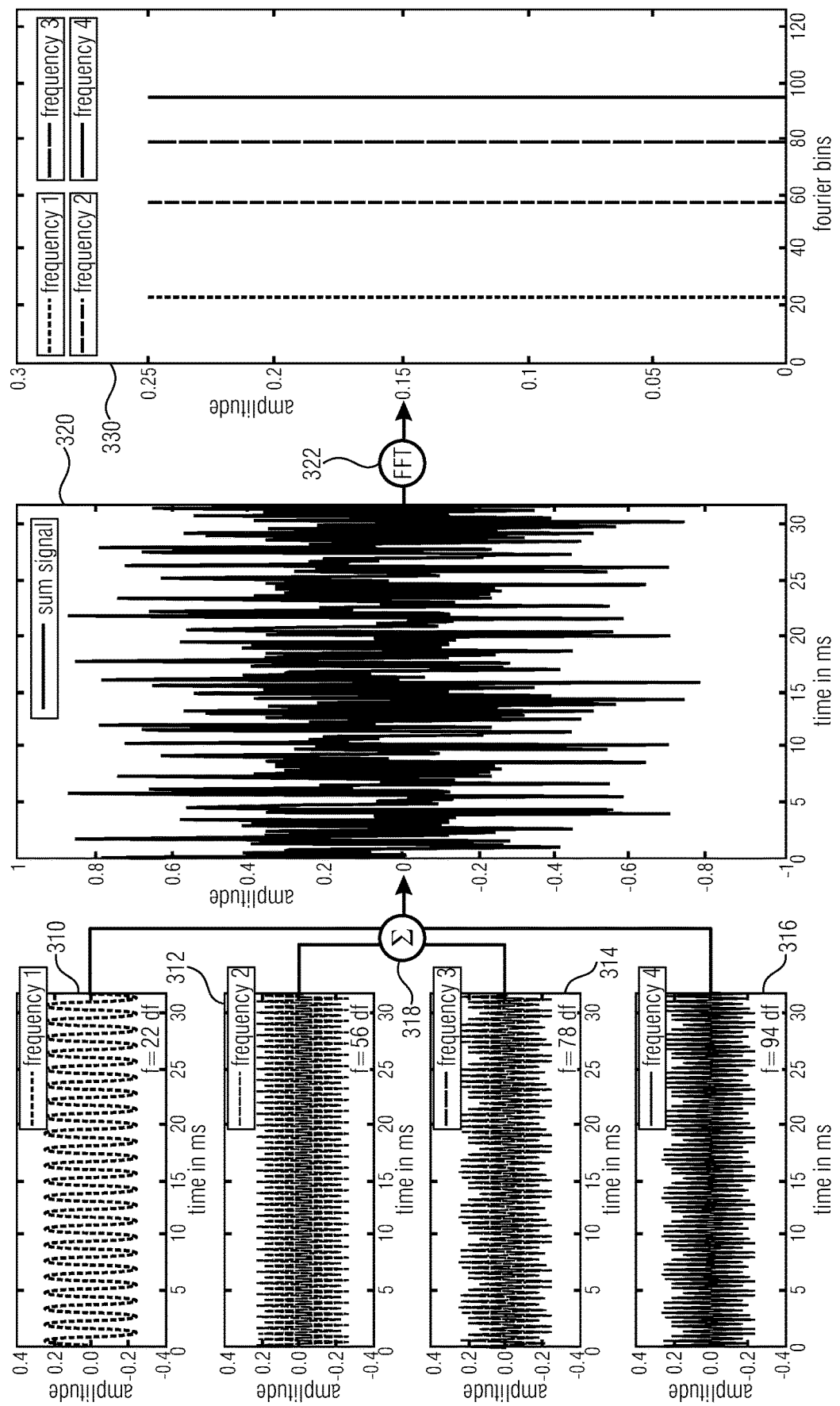
FIG. 3 shows the mapping of integer multiples of the frequency resolution onto grid points of a discrete FT spectrum according to an embodiment of the invention.

In FIG. 3, it is shown how integer multiples of the frequency resolution are mapped onto grid points (or nodes) of a discrete FT spectrum. In boxes 310, 312, 314 and 316, frequencies 1 to 4 are shown, wherein each of these frequencies is an integer multiple of the frequency resolution, i.e. of a base frequency. These frequencies are added by adder 318 to form a frequency spectrum. The resulting spectrum is shown in box 320. The spectrum of box 320 is subjected to a FT, for example to a Fast Fourier transform, FFT, by FFT module 322. The resulting Fourier spectrum, shown in box 330, comprises four distinct and well separated peaks, each of these peaks belonging to frequencies 1 to 4.

With this procedure, frequency patterns may be properly distinguished, and frame that contain an audio spectrum that deviates from this topology may be discarded. For example, as the procedure is not synchronized, that means that the FFT is performed with a sliding window and does not necessarily start with the beginning of a frame. In this case, if the window covers a part of a first frame and a part of the following frame and the data transmitted by these two frames is not identical, more peaks will occur in the FFT spectrum than expected, and in this case, the frame may be discarded.

The amplitudes of the occurring frequencies may be equal, because amplitude information is transmitted with a lower reliability as compared to transmitting frequency information. Nevertheless, the amplitude information may also be used as an option for embedding additional information into the signal.

As the information to be transmitted is coded into the appearance of the audio spectrum, the information density depends on the number of used frequencies in the signal and the number of available frequencies, i.e., the number of grid points. The number of possible permutations is calculated by the binomial coefficient $$\binom{n}{k} = \frac{n!}{k!\,(n-k)!},$$

where n is the number of grid points in the frequency spectrum and k is the number of frequencies occurring in the signal. In the case of voice connections, e.g. a GSM voice channel, frequencies between 300 Hz and 3400 Hz may be transmitted, which corresponds to the usual frequency range of speech.

As an example, the sampling rate may be e.g. 8 kHz. With a frame length of e.g. 32 ms, for example, this corresponds to 256 samples per frame. From this, an FT spectrum is resulting from 0-4 kHz with a frequency resolution of 31.25 Hz. This frequency resolution corresponds to the distance between two grid points in this spectrum. Considering that only frequencies from 300 to 3400 Hz may be transmitted by the codec, it follows that 98 grid points are available for modulation. Practical tests revealed that six frequencies with a good signal-to-noise ratio may be transmitted simultaneously. This corresponds to $1.0525*10^9$ combinations per frame, which corresponds to 29 bit. Hence, the system may transmit natural numbers from 0 to $$\binom{n}{k} - 1.$$

For this, an algorithm is used that maps a number to each of these frequency combinations.

Figure 4:
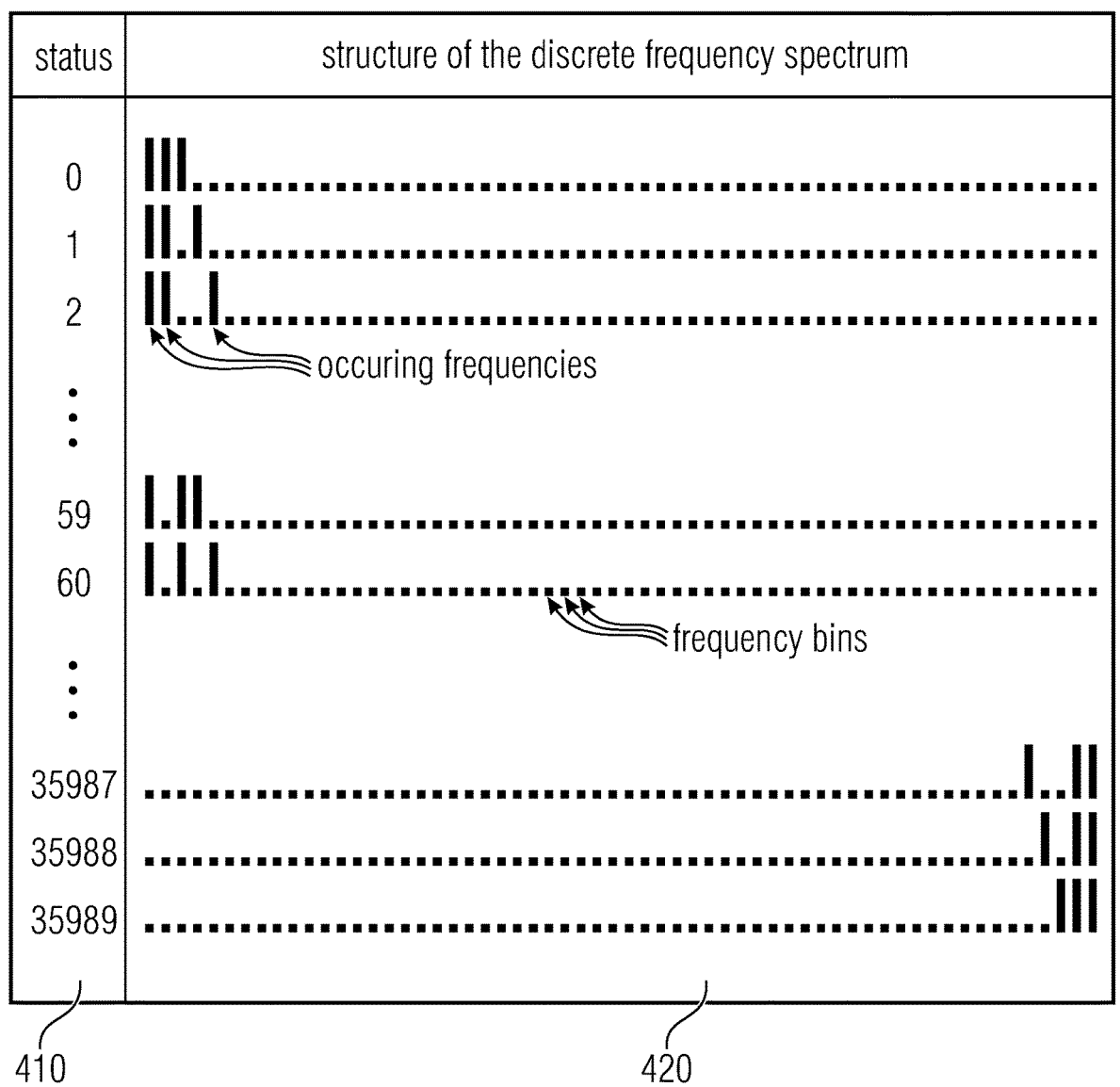
FIG. 4 shows an example for a mapping table according to an embodiment of the invention.

FIG. 4 shows a mapping table 400 for such a mapping as an example. FIG. 4 shows in the status column 410, possible statuses numbered from 0 to 35,989. Corresponding to each of these statuses, the other column 420 shows the structure of the discrete frequency spectrum. In this example, three frequencies are used and 61 grid points of the FFT spectrum are used, from which result 35,990 possible combinations.

In the general case, several signals are to be transmitted, but only a one dimensional vector can be transmitted. Hence, a reduction of the dimension of the information to be transmitted has to be performed. For the case, that several natural numbers have to be transmitted, a reduction of dimension has to be performed, this is depicted for a three-dimensional case in FIG. 5. The number of points in the three-dimensional space has to be smaller than or equal to $$\binom{n}{k}.$$

Then, each point can be assigned a one dimensional value and with this a particular frequency pattern. This may be applied to any arbitrary number of dimensions.

Figure 5:
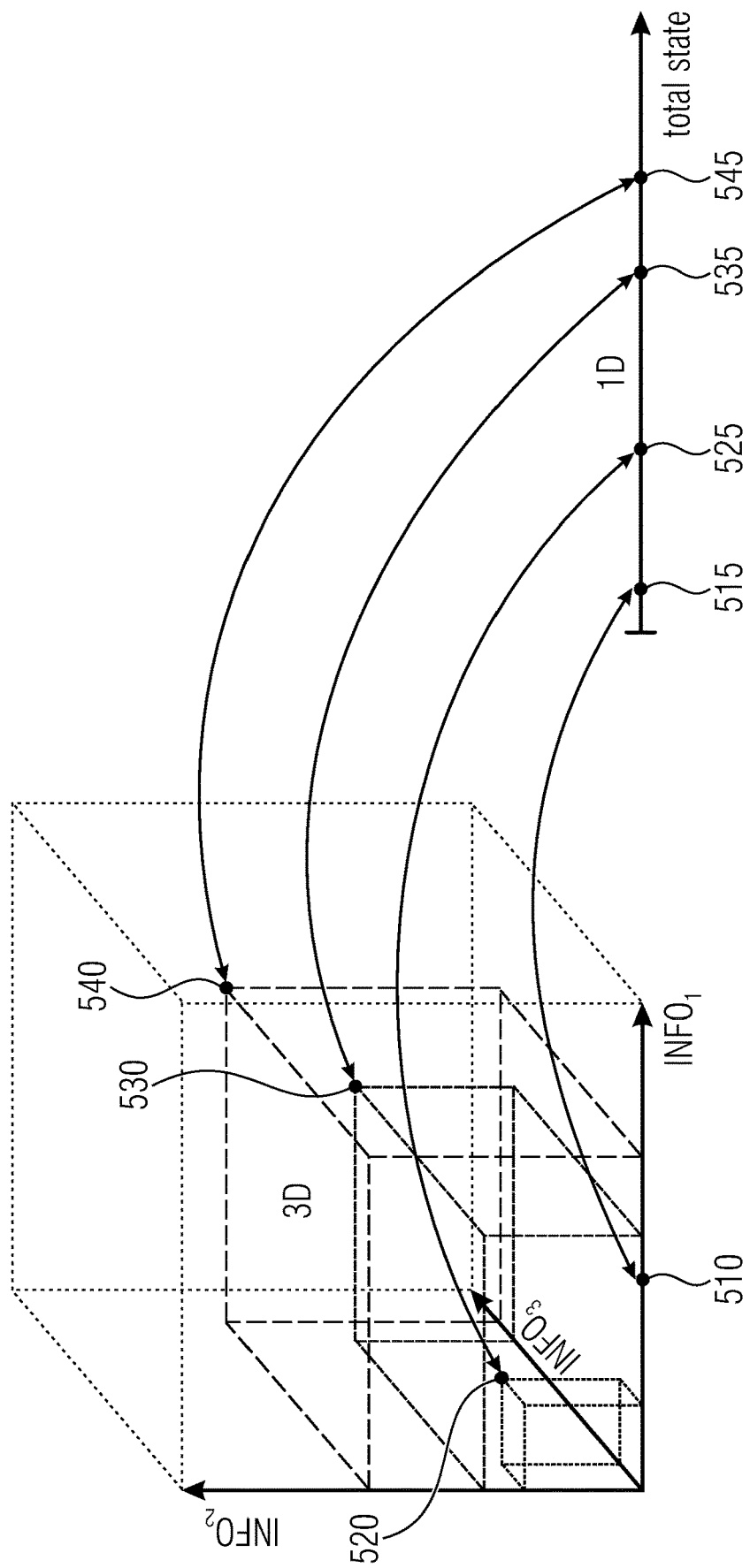
FIG. 5 shows a bijective mapping of a three-dimensional space onto a one-dimensional space according to an embodiment of the invention.

FIG. 5 shows a bijective mapping of a three-dimensional space onto a one-dimensional space. It is depicted that points in the three-dimensional space like points 510, 520, 530 and 540 are mapped into a one-dimensional space onto points 515, 525, 535 and 545, respectively. As this mapping is unique, no information is lost, and it can be switched from the three-dimensional space into the one-dimensional space in a bijective manner.

Usually, voice connections via mobile communication are bidirectional, also referred to as full duplex connections. Hence, the system can be operated in both directions. The downlink and uplink path of the connection including all coding and modulation steps of the transmitted data between two devices is shown in FIG. 6.

Figure 6:
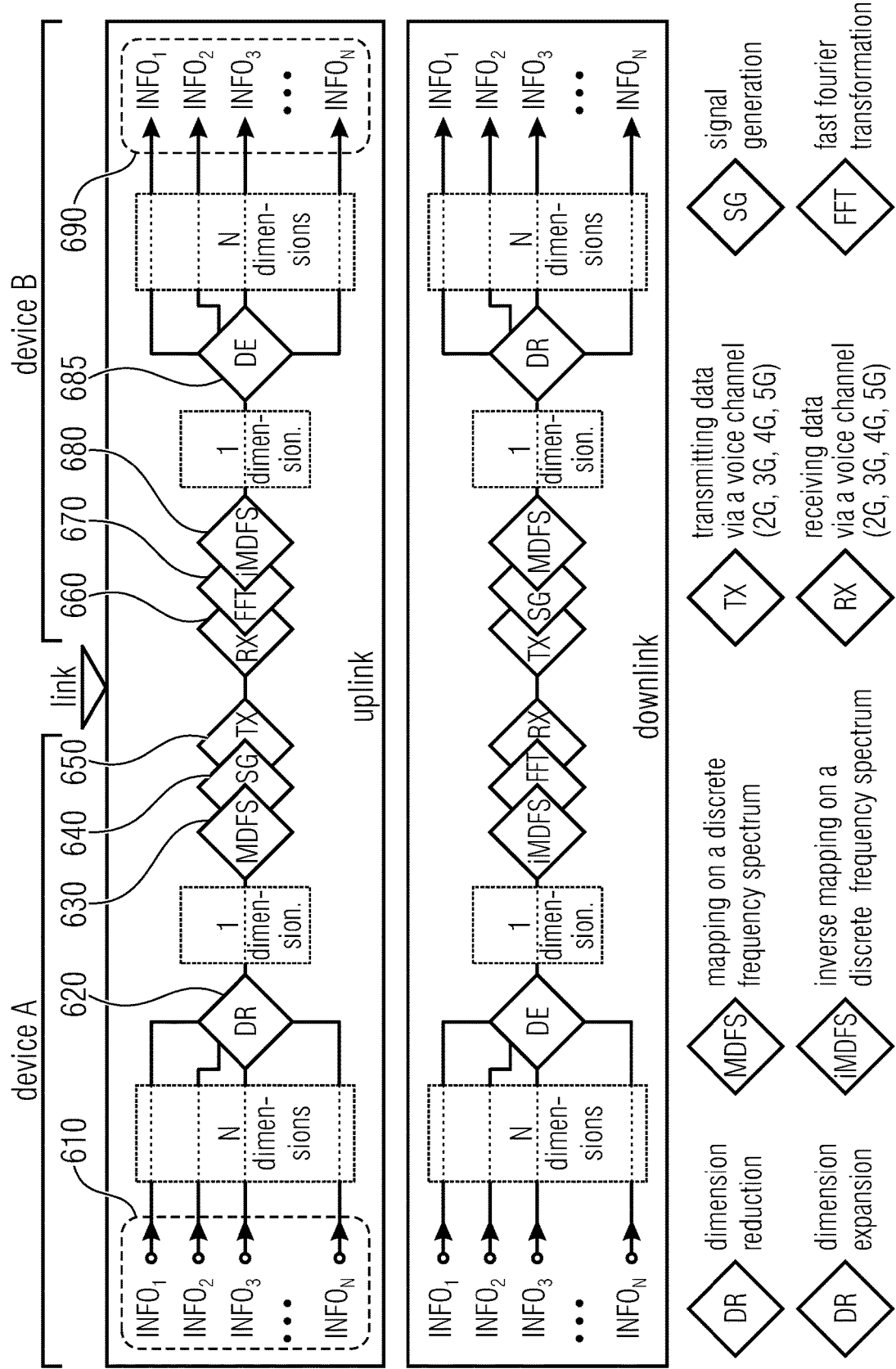
FIG. 6 shows the general case of transmitting information elements between two devices in a full duplex manner according to an embodiment of the invention.

FIG. 6 shows the general case where N information elements are to be transmitted between device A and device B. Device A and device B are connected via a voice connection or link, this voice connection comprises both an uplink and a downlink connection. In the uplink, information elements 610, namely $INFO_1$ to $INFO_N$, constitute an N dimensional space. This N dimensional space is reduced by a dimension reduction module 620 to a one-dimensional space. This one dimensional space is mapped on a discrete frequency spectrum by MDFS module 630. Based on the output of the MDFS element 630, a signal is generated by SG module 640, this signal is transmitted by a transmitter TX 650. The signal is received by receiver RX 660, after reception this signal is subjected to a Fourier transform, e.g. a fast Fourier transform by FFT module 670, and thereafter subjected to an inverse mapping on a discrete frequency spectrum by IMDFS module 680. The output is subjected to a dimension expansion by DE module 685, which results in N information elements 690. A similar procedure is performed using the downlink in the reverse order.

Using the fact that voice may be transmitted simultaneously in both directions in a mobile communication network makes it possible, for example, to simultaneously control and detect a UAV.

Because of the reduced data rate, only simple sensor data like position and height can be transmitted in real time from the drone to the bases, since a delay of smaller than 400 ms is sufficient, in general, to satisfy the real time requirement.

Control of UAVs

In the following, a procedure is described how a UAV may be controlled using the before mentioned technique. It is clear to the person skilled in the art that controlling an UAV is merely an example for devices that may be controlled in such a manner, and it clear that any device, be it a vehicle or a coffee maker, that can be a part of a mobile communication network may be implemented in accordance with the control technique described in this application.

In this example, a UAV may be controlled and stabilized using a flight controller, these devices only need simple control commands from a base station. Such control commands comprise, in general, altitude information and a change rate for altitude (climb or descend), pitch (angle of inclination/movement around lateral or pitch axis), roll (movement around longitudinal or roll axis) and yaw (movement around vertical or yaw axis). For semiautomatic flying, there may be a fifth command, the flight mode (maintain altitude, maintain position, back to base, etc.).

These five basic control commands open up a five-dimensional space. Having, for example, six active frequencies in the audio signal and 98 available grid points in the FFT spectrum, it is possible to communicate 120 different states for each control command (climb rate, pitch, roll, yaw) and five different flight modes in a 32 ms frame. This should be more than sufficient to provide a smooth control of the UAV. Functions such as climbing to a given height, return to the base or automatic landing may be realized using flight modes. Insofar, five possible states per control command would be sufficient to provide a working control.

Localization of UAVs

For localizing a UAV, for example, longitude, latitude and height information is sufficient, in particular cases the orientation may also play a role.

Latitude and longitude are strongly correlated data from the view of moving objects. The coordinates change from one moment to another only slightly in the decimal places. In this case, it is fully sufficient to transmit only differences. As the communication protocol operates without acknowledgment messages, the changes should refer to predefined fixed coordinate. Regarding the height information it may be sufficient only to transmit the difference to a given height, for example, the starting point.

As an example, having 98 grid points in the frequency spectrum and 6 active frequencies, this results in the possibility to code the height with a resolution of one meter on a scale of 0-100 meters. Latitude and longitude could be changed in steps of 0.0002 degrees yielding a radius of action of approximately 3 km in which the UAV may be localized with an accuracy of approximately 2 meters. The accuracy may be adapted appropriately to a given case.

By considering acknowledgment messages, the range limitation may be abandoned. The acknowledgment messages may use additional information channels with which the reference coordinates may be defined. For this, it would be needed to re-define the reference coordinates before the UAV leaves its radius of action. In the aforementioned description, a mobile communication system has been mentioned, and it is evident that any mobile communication system that provides voice communication may work the described technique, such as 2G, 3G, 4G/VoLTE and 5G systems.

In such communications systems, the latencies of voice based transmission technology are designed to be very low to provide that the communication between people appears natural. In the case of GSM, the latency is much smaller when compared to the data channels in GSM, UMTS and/or LTE in the case that no end-to-end QoS is provided. Voice connections have an adequate quality of service, QoS, regarding latency, packet jitter and data rate, which leads to the fact that the connection is fast and reliable, independently of the communication system used.

A further advantage is that the GSM systems are well developed in many countries. When the UAV is connected via a mobile communication to the mobile internet, the control unit may be connected using many communication means as long as these are able to transfer speech.

The described system is simple and robust, because the communication protocol does not need a defined frame start or frame end, but a section of the audio signal is sufficient to decode the information properly. In the case that the chosen section comprises a time point in which the transmitted value changes, the proper decoding is not possible. This case can be detected by assessing the frequency spectrum, when the spectrum contains more peaks and/or smaller amplitudes than expected, such frame may be discarded and the next frame is used instead. The window size is freely selectable and is usually between 16 ms and 32 ms.

As usual for voice connections a so-called flat rate is available, no extra cost for the transfer of this data is due, and hence the cost for the transmission of the control data is comparably small. This is opposed to the communication of the mobile internet, which usually has to be paid for the used amount of data.

Transition Between Frames

In the voice channel, usually compression techniques are applied which are based on the fact that speech changes smoothly. This means that for speech there are no discontinuities in the time signal. In the moment where the frequencies contained in the signal have to change, the transition will be steady, without "jumps", i.e. abrupt transitions.

Figure 7:
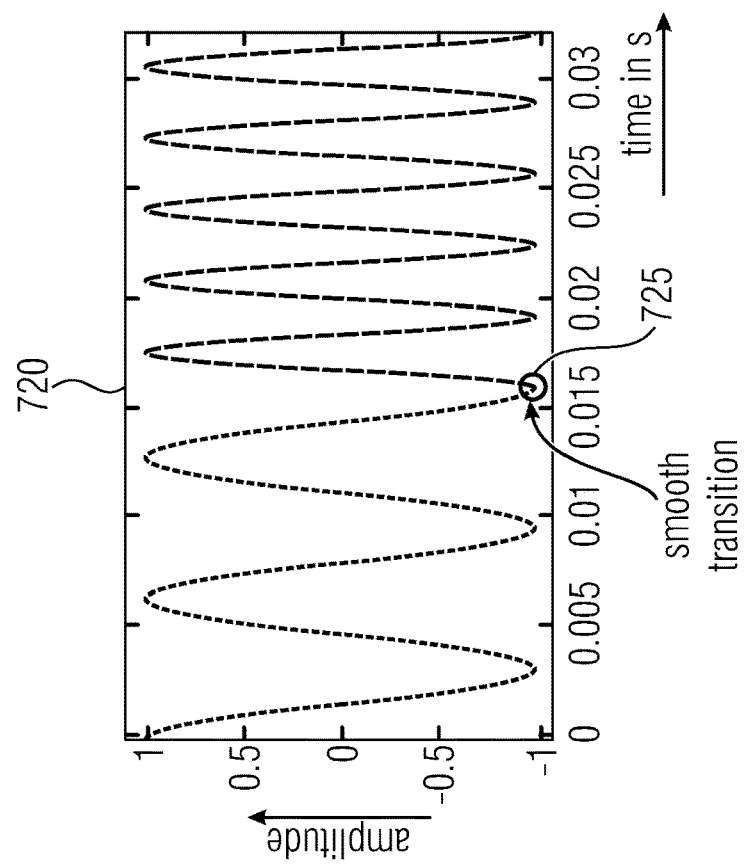
FIG. 7 shows examples for abrupt and smooth transitions between frames according to embodiments of the invention.
Figure 7:
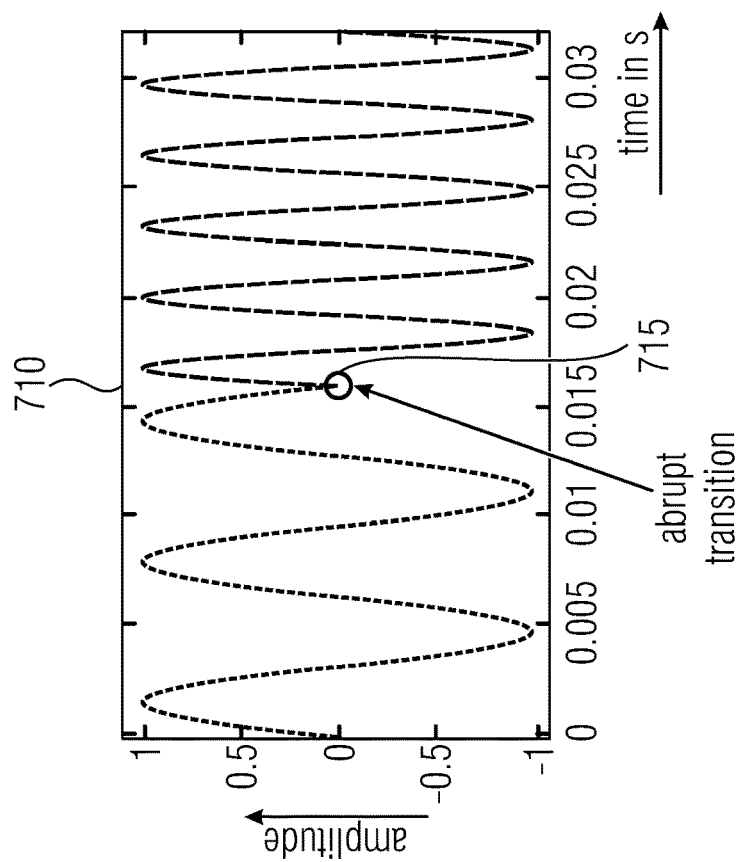

This is depicted in FIG. 7 wherein box 710 an abrupt transition 715 between two frames, with respect to a particular frequency, is shown. In box 720 a smooth transition 725 between two frames, with respect to a particular frequency is depicted.

As mentioned before, there is no synchronization between transmitter and receiver, and therefore the state information to be transmitted has to be sent at least twice as long as the duration of the frame to be analyzed is for obtaining a clean spectrum. This is valid only for the case that the point in time is chosen arbitrarily, which is the case without synchronization, and that the FFT is only applied to this particular window.

Figure 8:
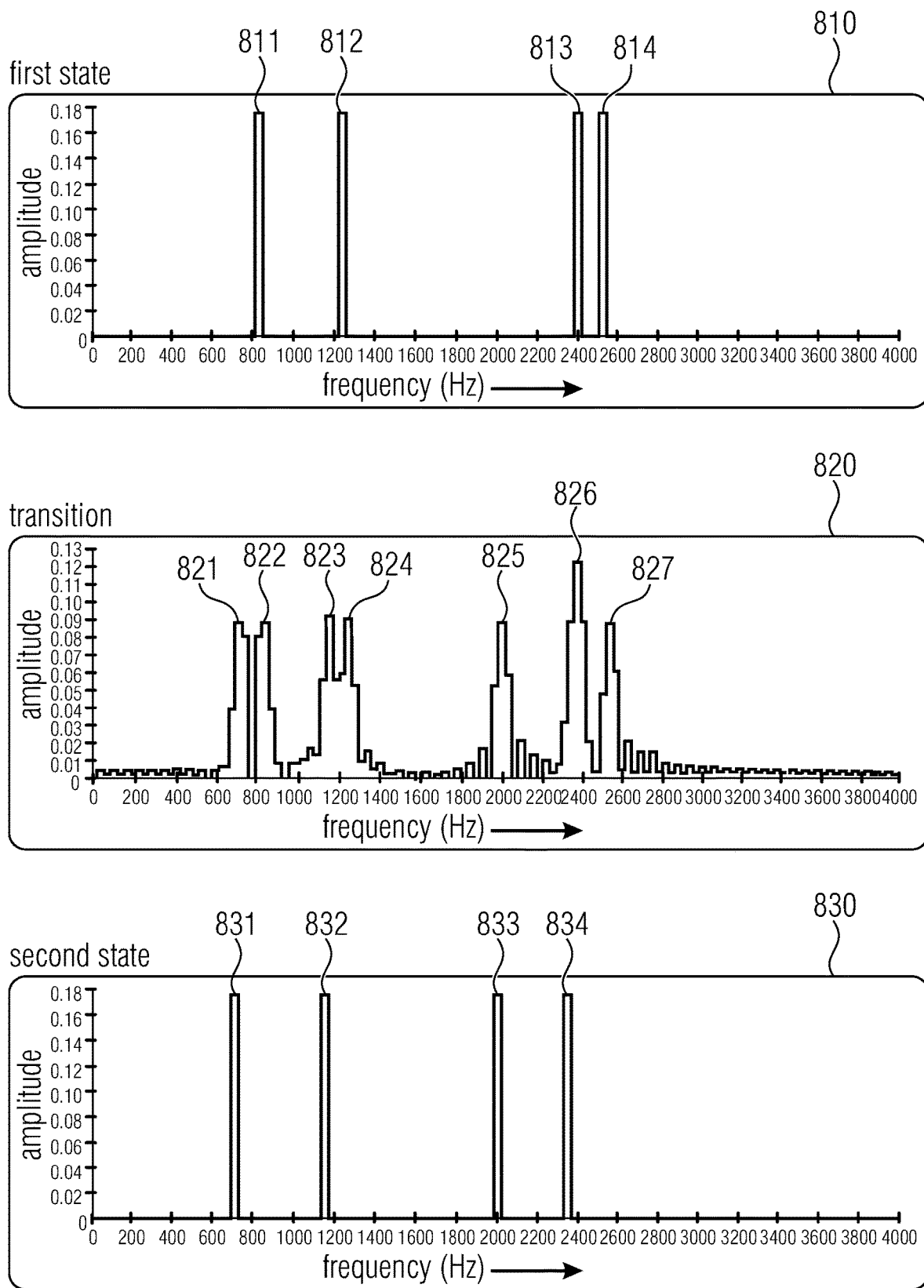
FIG. 8 shows examples for transitions of the Fourier spectrum according to an embodiment of the invention.

FIG. 8 shows examples for frames that represent the transition between two states. In box 810, a clean spectrum of a first state is shown with four peaks 811 to 814 at different frequencies. The term state refers to a particular combination of frequencies that conveys a particular command or user data. Similarly, box 830 of FIG. 8 shows also four peaks 831 to 834 belonging to a second state, but these peaks are at different positions as compared to peaks 811 to 814 of box 810. Box 820 represents the transition between the first state of box 810 and the second state of box 830, and it is visually apparent that this spectrum deviates from the before discussed spectra of boxed 810 and 830 as there are no clear peaks contained due to the mixture of frequencies. This mixture leads to more peaks than the expected four peaks, in this case to seven peaks 821 to 827, and theses peaks are broader and surrounded by noise. In this case, the spectrum cannot be properly decoded.

The spectrum of box 820 will be discarded because it does not correspond to the topology of the spectrum. This can be decided by searching the N+1 biggest peaks, where N represents the number of peaks that have to be contained in the spectrum, in this example four. If detected, peak N+1 is therefore the result of noise or a mixture of different spectra representing different states.

A possible criterion for identifying a valid frame may be that the amplitude of peak N+1 has to be at least three times smaller than the smallest amplitude of the first N peaks. This criterion is an example only and can be adapted appropriately.

Alternatively to the discarding criterion used for discarding frames that contain a number of peaks not equal to the expected number of peaks, a frame can also be discarded in the case that the frame contains frequencies that do not correspond to integer multiples of the base frequency.

Given sufficient computational power, a kind of synchronization between transmitter and receiver may be achieved. For this, a moving array or moving window will be used that will be updated after each audio sample by deleting the first entry of the array and by appending a new value at the end. To provide for synchronization, a FFT could be applied after each recorded sample on the array, and the resulting spectrum may be investigated according to the above criteria, whether or not it is a valid frame. In this case, it may not be needed that the duration of a state has to be twice the frame length.

Mapping of Frequencies to Grid Points in the Amplitude Spectrum

The Fourier transformation of a time discrete signal yields a discrete frequency spectrum and is called discrete Fourier transformation. For example, the FFT, Fast Fourier Transform, is an optimized algorithm for calculating a discrete Fourier transform. This entails that lengths of the array are a power of 2, for example, 64, 128, 256, . . . . Because the discrete frequency spectrum has a finite number of grid points, the frequency resolution is limited. The frequency resolution $\Delta f$ may be calculated by $$\Delta f = \frac{\text{sample rate(in Hertz)}}{\text{number of values}}.$$

For example, in case a frame has 256 values, and the sampling rate is 8 kHz, the frequency resolution is 31.25 Hz. By increasing the duration and the number of values, the frequency resolution may be raised, for example to 512 samples at 8,000 kHz. In this case the frequency resolution is 15,625 Hz. The frequency resolution denotes the smallest frequency distance of two sinusoidal processes that can still be distinguished.

It follows that frequencies being integer multiples of the frequency resolution are mapped exactly to the discrete grid points. Frequencies that are not integer multiples, which are between two grid points, show up in the discrete frequency spectrum as apparent superposition of multiple frequencies.

Interaction with Speech Codecs

For saving bandwidths, speech usually is strongly compressed in mobile communication networks. For compressing speech, it is utilized that the development of the amplitudes over time changes relatively slowly. This property is also the basis for the modulation. Practical experimentation has shown that the transmission works with all codecs presently used without problems. This holds true for GSM, as well as for UMTS. It can be assumed that this system also works with VoLTE. It in a first approximation, the more bandwidth that is available for the transmission, the less impaired the quality of the audio signal by the codec is.

In the following, embodiments are described that are based on the techniques described before.

Figure 9:
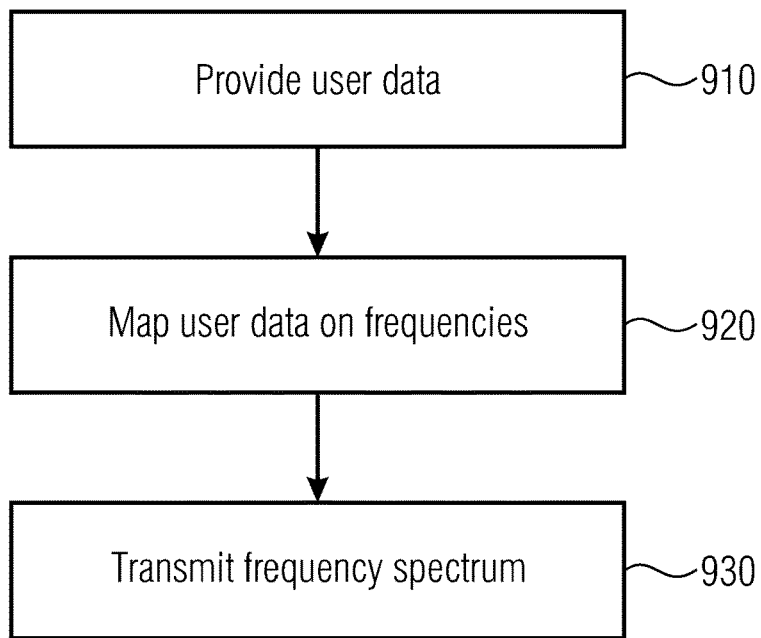
FIG. 9 shows a flowchart of a method for providing control signals according to an embodiment of the invention.

FIG. 9 shows a flow chart for a method 900 for providing control signals from a transmitting device to a receiving device. The transmitting device and the receiving device are connected by a mobile communication connection; this connection comprises a voice channel. In step 910 user data is provided, the user data comprises control signals being used for controlling an operation of the receiving device. In step 920, the user data is mapped on a predetermined number of frequencies of a frequency spectrum of the voice channel. In optionally step 930, the frequency spectrum is transmitted to the receiving device. The mapping 920 of the user data is performed in accordance with what has been described in connection with FIGS. 3 and 4. In more detail the user data provided in step 910 comprises control signals that are used for controlling the receiving device. The user data may be, in a general case, multidimensional, in this case the user data is transferred from the multidimensional space into a one-dimensional space for facilitating the mapping 920 of the user data to frequencies. The mapping of the user data to frequencies may be performed in accordance with FIG. 4, for example by mapping a particular user data, that represents one of the statuses described in box 410 in FIG. 4 to a particular combination of frequencies shown in box 420 in FIG. 4. As soon as the particular frequency combination is known, these frequencies are added together into a frequency spectrum, such as frequency spectrum 320 known from FIG. 3. This frequency spectrum is then transmitted 930 to the receiving device.

Figure 10:
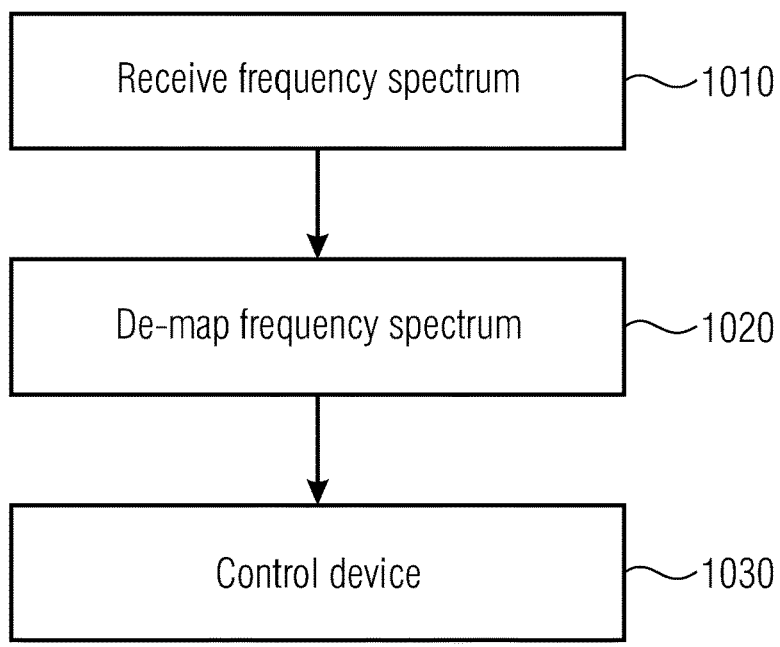
FIG. 10 shows a flowchart of a method for controlling a receiving device according to an embodiment of the invention.

FIG. 10 shows a flow chart of a method 1000 for controlling the operation of a receiving device via a mobile communication connection. In step 1010, the frequency spectrum is received by the receiving device. In step 1020, the frequency spectrum is de-mapped. In step 1030, the receiving device is controlled based on the obtained control signals.

In more detail, a frequency spectrum is received 1010 by the receiving device. This frequency spectrum comprises a predetermined number of frequencies, wherein control signals for controlling the operation of the receiving device are mapped to the frequencies. The frequencies of frequency spectrum are de-mapped 1020 to obtain the control signals. This de-mapping may comprise performing a Fourier transform of the frequency spectrum to obtain the constituent frequencies contained in the frequency spectrum. As described before, frequencies are used that are integer multiples of a base frequency optionally, particular amplitudes of the peaks of the frequency spectrum may be extracted. The frequencies contained in the frequency spectrum represent a particular combination of these integer multiples of the base frequency, this particular combination of frequencies is then translated into a particular control information, for example using the table shown in FIG. 4. Knowing the particular combination of frequencies contained in the frequency spectrum, it is possible to infer from this combination a status of the statuses defined in column 410 in FIG. 4. When the particular status that is connected to the frequency combination is detected, the particular state represented by this one dimensional information may be transferred back into a multidimensional space, if needed, in accordance with FIG. 5.

Figure 11:
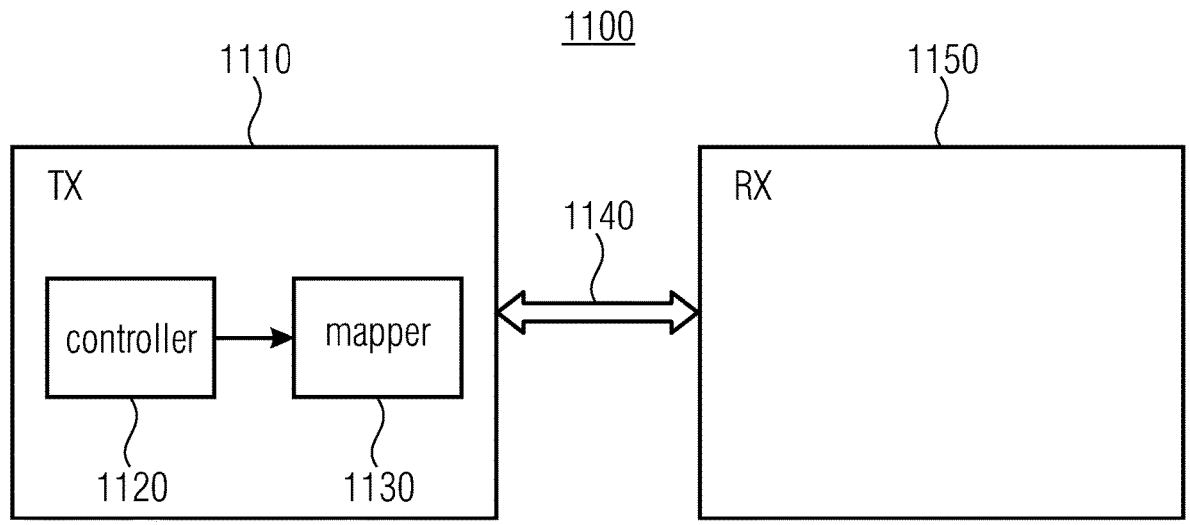
FIG. 11 shows a block diagram of a transmitting device for providing control signals according to an embodiment of the invention.

FIG. 11 illustrates the operation of a transmitting device 1010 that is connected with a receiving device 1150 by a mobile communication connection 1140 that comprises a voice channel. The transmitting device 1110 comprises a controller 1120 that provides user data, the user data comprising control signals for controlling the operation of the receiving device. The control data is provided by the controller 1120 to a mapper 1130, the mapper is mapping the user data on a predetermined number of frequencies of a frequency spectrum. The transmitting device operates in accordance with method 900 described before.

Figure 12:
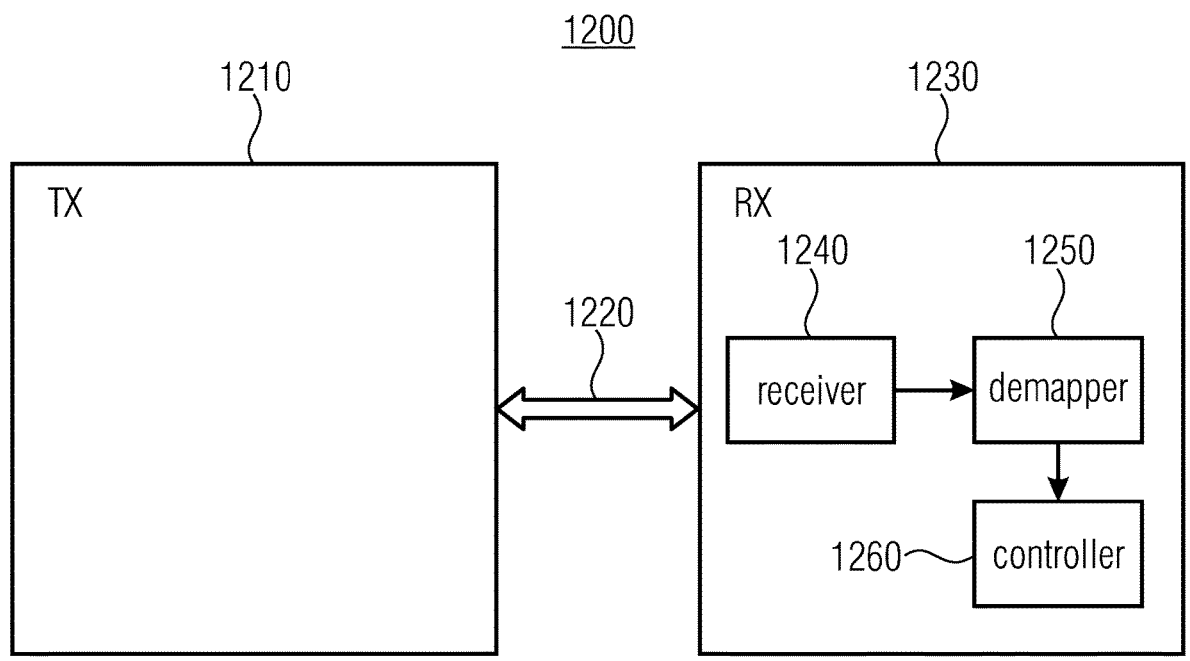
FIG. 12 shows a block diagram of a receiving device for controlling the receiving device according to an embodiment of the invention.

FIG. 12 shows receiver 1230 for controlling the receiver 1230 via a mobile communication connection between a transmitting device 1210 and the receiving device 1230, wherein the communication connection 1220 comprises a voice channel. The receiving device 1230 comprises a receiver 1240 that receives a frequency spectrum that comprises a predetermined number of frequencies, wherein control signals for controlling the receiving device 1230 are mapped to the predetermined number of frequencies. Further, the receiving device comprises a de-mapper 1250 which de-maps the frequency spectrum to obtain control signals and comprises a controller 1260 to control the receiving device 1230 based on the obtained control signals.

The receiving device 1230 operates in accordance with the method 1000 defined in relation to FIG. 10.

It is to be noted that the mobile communication connection shown in FIGS. 11 and 12 may be a circuit switched mobile communication, for example used in GSM systems, but may also be a packet switched communication connection used, for example, in UMTS, LTE or 5G systems.

As has been described above, in accordance with embodiments of the present invention, a certain control or status information or word may be represented by a unique structure of the discrete frequency spectrum associated with the respective status word. As explained above with reference to FIG. 4, for example, when using for the transmission of a status word a frequency spectrum including sixty-one frequencies, each status word 410 may be represented by three peaks in the discrete frequency spectrum which occur at respective different frequency positions of the spectrum thereby defining for each status word 410 a unique structure of the discrete frequency spectrum. In other words, when considering FIG. 4, status word "0" is represented by a frequency spectrum having peaks at the first, second and third frequency positions, whereas, for example, status word "16" is represented by three peaks in the frequency spectrum occurring at the first, third and fifth frequency or frequency bins. The respective status words may be associated with different control words to be used for controlling the receiving device or, stated differently, the status words may represent specific control instructions to be transmitted to the receiving device, responsive to which the device may change its operation.

In accordance with embodiments, the frequency spectra to be used for transmitting the respective status words over the voice channel include a number of peaks which is substantially lower than the overall number of frequency bins so as to achieve a high compression ratio. The number of peaks to be used is between three peaks, as in FIG. 4, and ten peaks. For transmitting the status words which have to be represented by three peaks in the frequency spectrum, as described above with reference to FIG. 4, each of the status words 410 in FIG. 4 may be represented by a unique binary word including only three "ones". For example, in FIG. 4, a sixty-one bit word may be used and each word includes only three "ones" and the remaining bit positions are "zeros". In other words, in FIG. 4 the vertical bars may be considered as representing "ones" and the "dots" may be considered as representing "zeros" so that for each of the status words 410 a unique 61 bit word exists. The 61 bit word representing the respective status words in FIG. 4 may, for example, be applied to an OFDM encoder which generates the transmit signal, which is transmitted over a channel and is decoded at an OFDM decoder in a way explained below ion more detail with reference to FIG. 13.

Naturally, the inventive approach is not limited to the representation of the respective status words as indicated in FIG. 4, rather, any binary word including between three to ten bits may be used for representing a plurality of status words 410, each status word being represented by a unique bit combination. Thus, in accordance with other embodiments, as just mentioned, the number of bits may be less than in the embodiment of FIG. 4, for example, eleven bit words may be provided, each including eight "ones" for representing a plurality of unique status words. For example, a status word having the value "983", which may be associated with a certain command to be transmitted to the receiving device, may be represented by the eleven bit word "01111010111". In such a case, the input bit word or bitstream may not be sufficiently long for an OFDM encoder used for encoding the input data for the transmission over a voice channel of the wireless communication system. In such a case, the input bit word or bitstream is extended.

Figure 13:
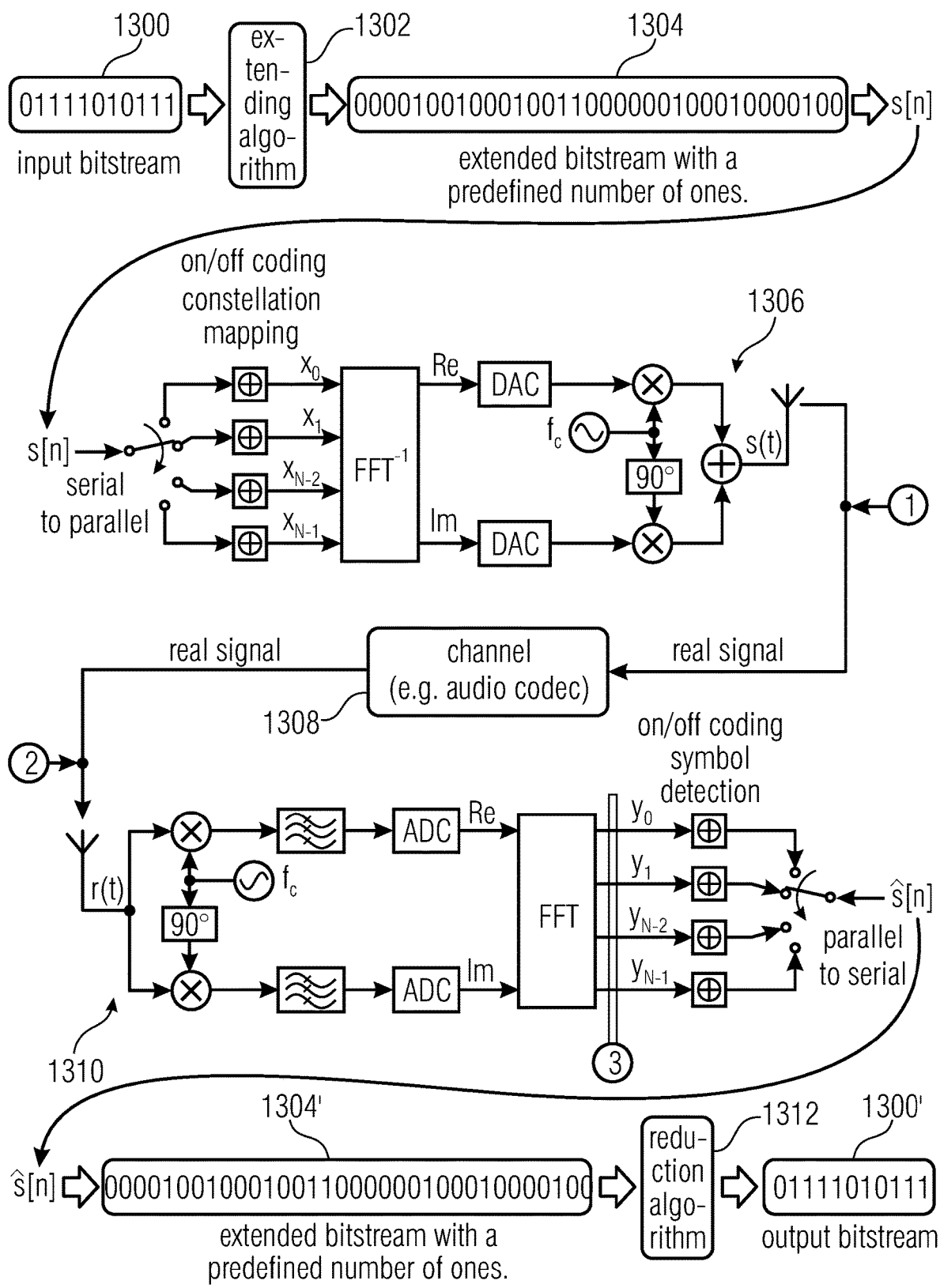
FIG. 13 describes an embodiment for transmitting a bit word over a wireless communication channel using OFDM encoding/decoding.

FIG. 13 describes an embodiment for transmitting a bit word over a wireless communication channel using OFDM encoding/decoding. In the example of FIG. 13, an input bitstream 1300 is represented which, in the depicted example, corresponds to the above-mentioned bitstream representing the value "983" being associated with a certain control information to be transmitted. The input bitstream 1300 has a length which is less than the length of an input bitstream on the basis of which the OFDM encoding/decoding entities operate. Therefore, an extending algorithm 1302 is applied to the input bitstream 1300 yielding an extended bitstream 1304. As mentioned above, the number of peaks in the frequency spectrum on the channel is between three and ten peaks, so that extending the input bitstream 1300 to the extended bitstream 1304 is performed by the extending algorithm 1302 in such a way that the number of "ones" in the input bitstream 1300 and in the extended bitstream 1304 is identical or the same. Stated differently, in the depicted embodiment, the extending algorithm 1302 inserts "zeros", so as to extend the eleven bit word 1302 to the extended thirty-four bit word 1304. Naturally, dependent on the implementation of the encoder/decoder and the available frequencies, the number of bits in the extended bit word 1304 may be different.

Figure 14:
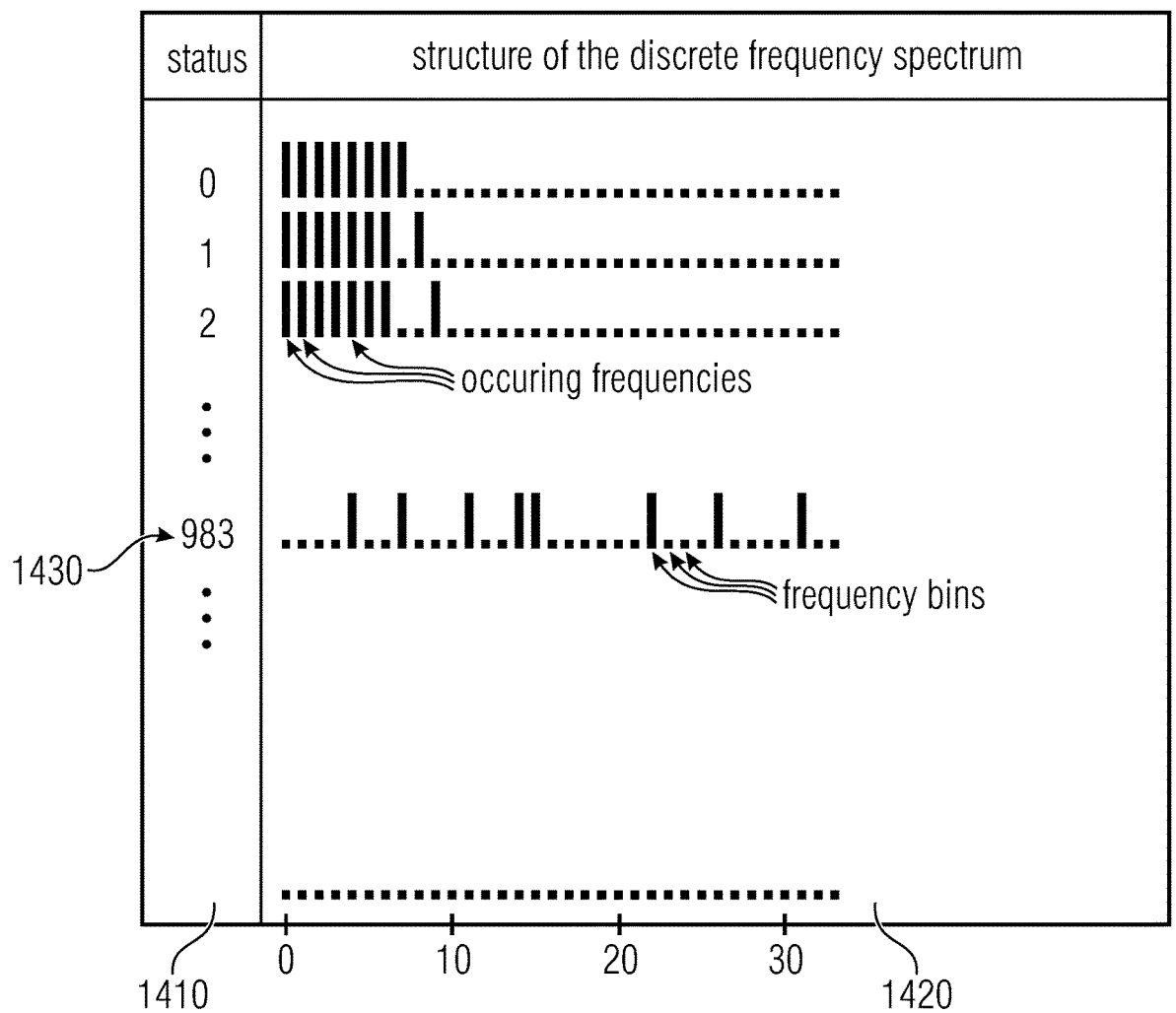
FIG. 14 shows another example for a mapping table according to an embodiment of the invention, FIGS. 15(*a*)-15(*d*) illustrate examples of the respective signal at the locations ①, ②  and ③ in FIG. 13 when employing a carrier frequency which is an integer multiple of the frequency resolution, and FIGS. 16(*a*)-16(*d*) illustrate examples of the respective signal at the locations ①, ②  and ③ in FIG. 13 when employing a carrier frequency which is not an integer multiple of the frequency resolution.

The extended bitstream of the embodiment of FIG. 13, when being represented in a similar way as in FIG. 4, is represented in FIG. 14. In FIG. 14, like in FIG. 4, the respective status words are represented in the area 1410 and the discrete frequency spectrum is indicated in section 1402 in which the vertical bars indicate peaks in the spectrum and the dots indicate zeros in the spectrum. Thus, in the example of FIGS. 13 and 14, each of the status words is represented by a unique thirty-four bit word including eight "ones", and the exemplary bit word 1300 representing the value 983 is also depicted in FIG. 14 at 1430.

The extending algorithm 1302 operates in such a way that for each unique input bitstream 1300 a corresponding unique extended bitstream 1304 is obtained, for example by using a codebook mapping each of the eleven bit words 1300 representing respective different control words, to a unique extended bit word which is then applied to the OFDM encoder 1306.

The OFDM encoder 1306 receives as an input signal s(n) and performs a serial to parallel conversion so as to obtain 34 parallel input streams which are applied to the inverse Fast Fourier transformation. The encoder 1306 outputs the analog signal s(t) that is transmitted via the transmitter's antenna over a wireless channel 1308 to the receive antenna of the receiver including an OFDM decoder. More specifically, the signal r(t) that is received at the receiver's antenna via the channel 1308 is input into the OFDM decoder 1310 which generates at its output the decoded signal s(n) which includes the decoded extended bitstream 1304'. The extended bitstream 1304' is applied to a reduction algorithm 1312 so as to generate on the basis of the extended bitstream 1304' received at the receiver the output bitstream 1300' which represents the original control word or value represented by the input bitstream 1300 and on the basis of which the receiver may now control its operation. As is indicated in FIG. 13, in accordance with embodiments the OFDM encoder 1306 and the OFDM decoder 1310 apply an on/off coding so that the presence of a sub-carrier (on) represents a binary one, while its absence (off) represents a binary zero.

The reduction algorithm 1312 may operate in a similar manner as the extending algorithm 1302 in that a codebook is provided which maps each of the extended bitstreams to a unique output bitstream and, again, the extended bitstream 1304' and the output bitstream 1300' include the same number of "ones".

Figure 15A:
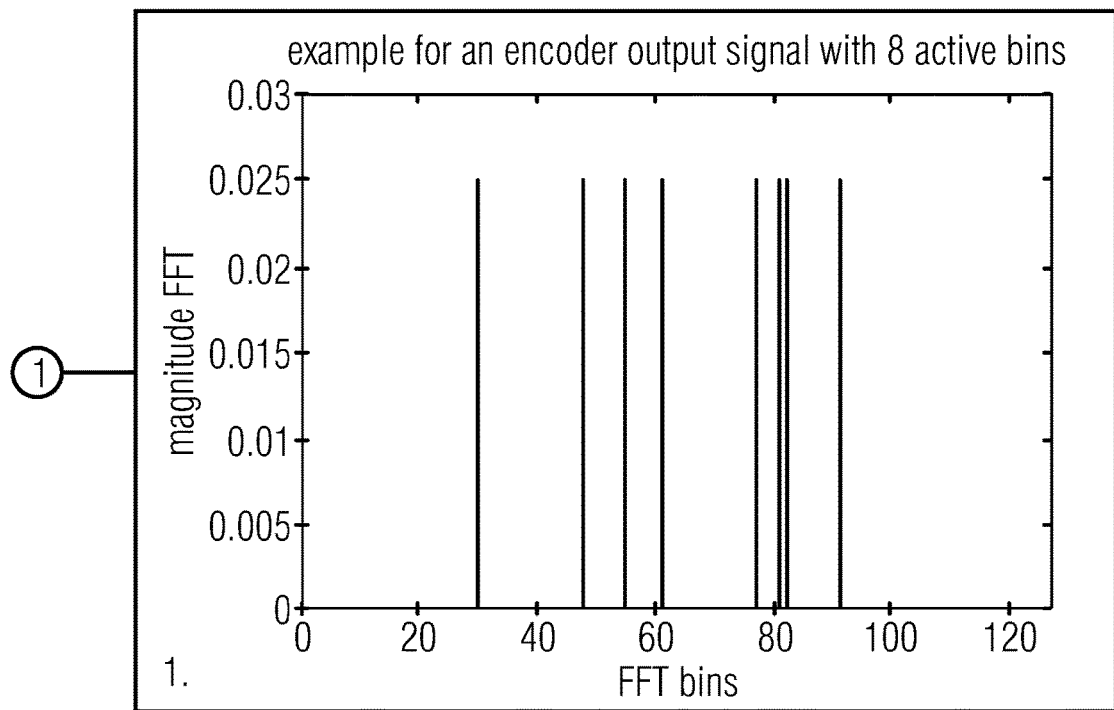
Figure 15B:
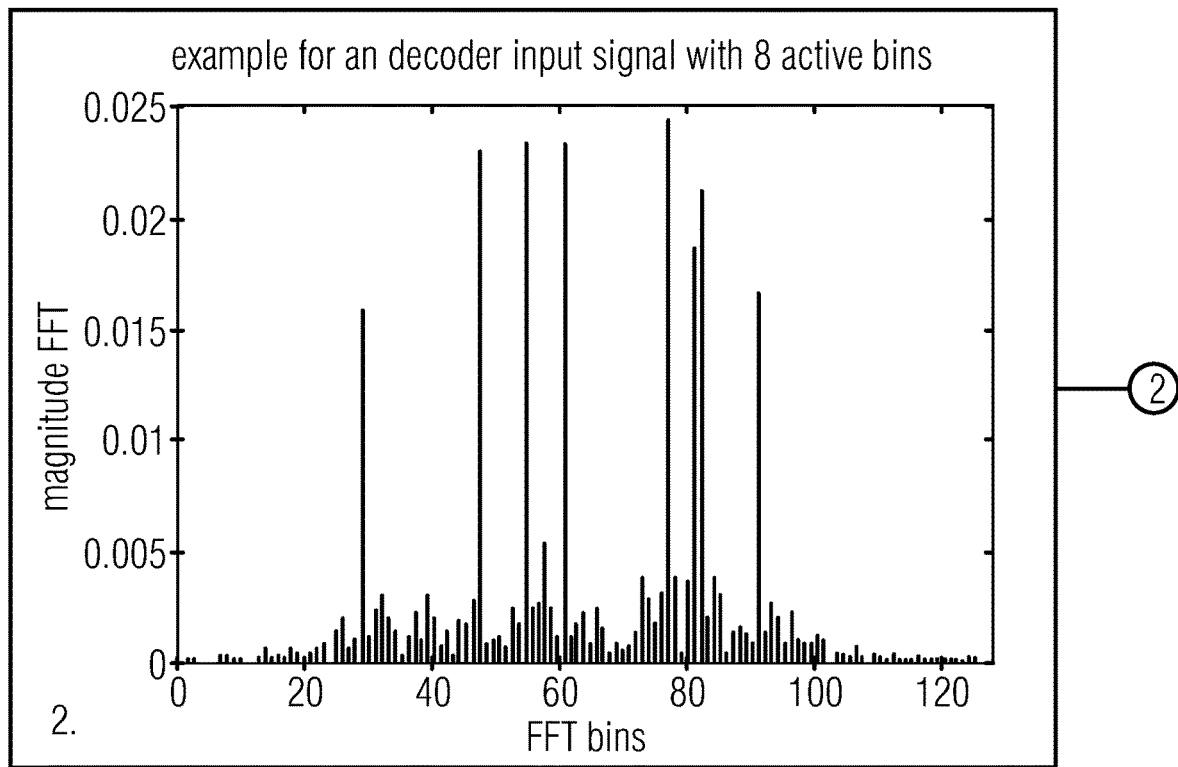
Figures 15C, 15D:
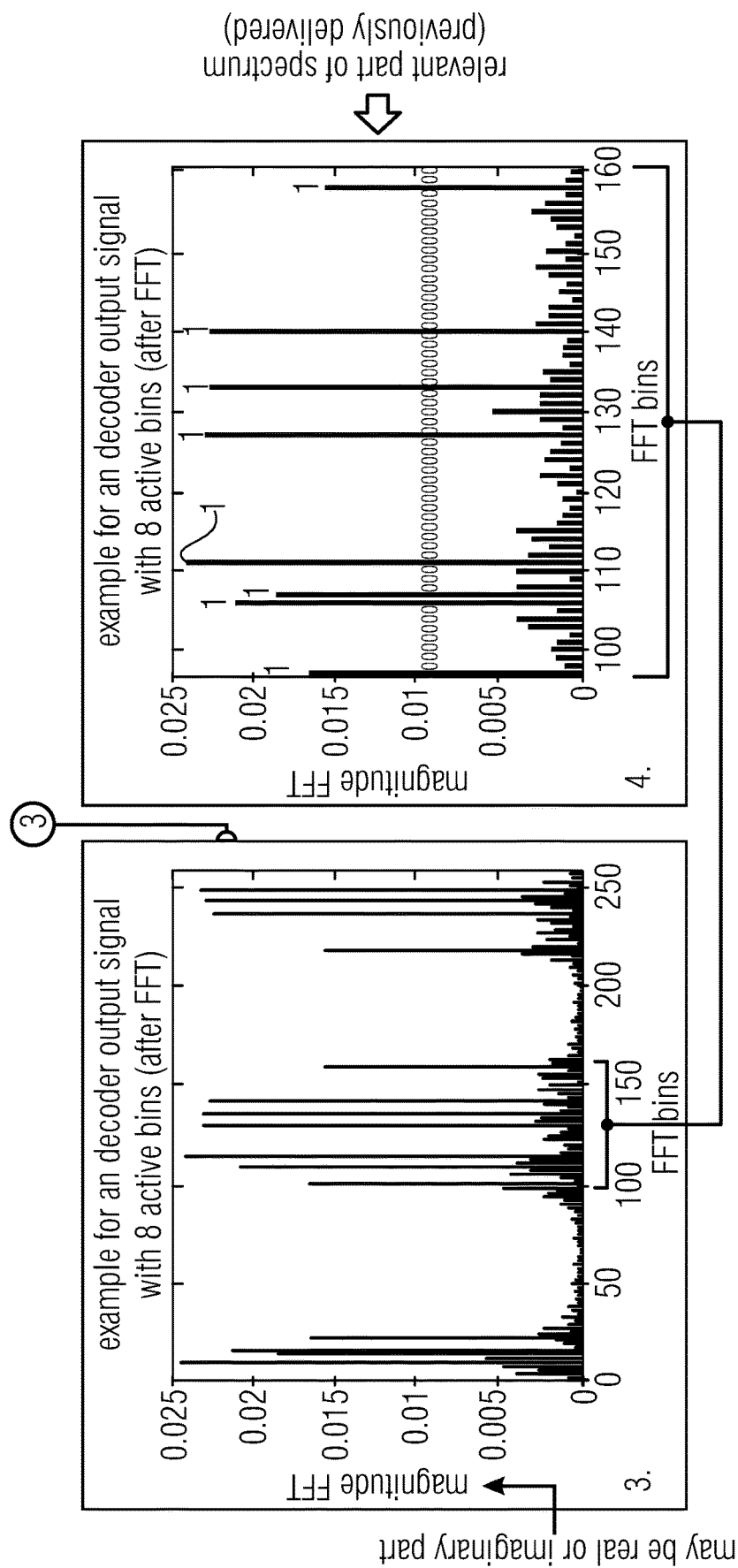
Figure 16A:
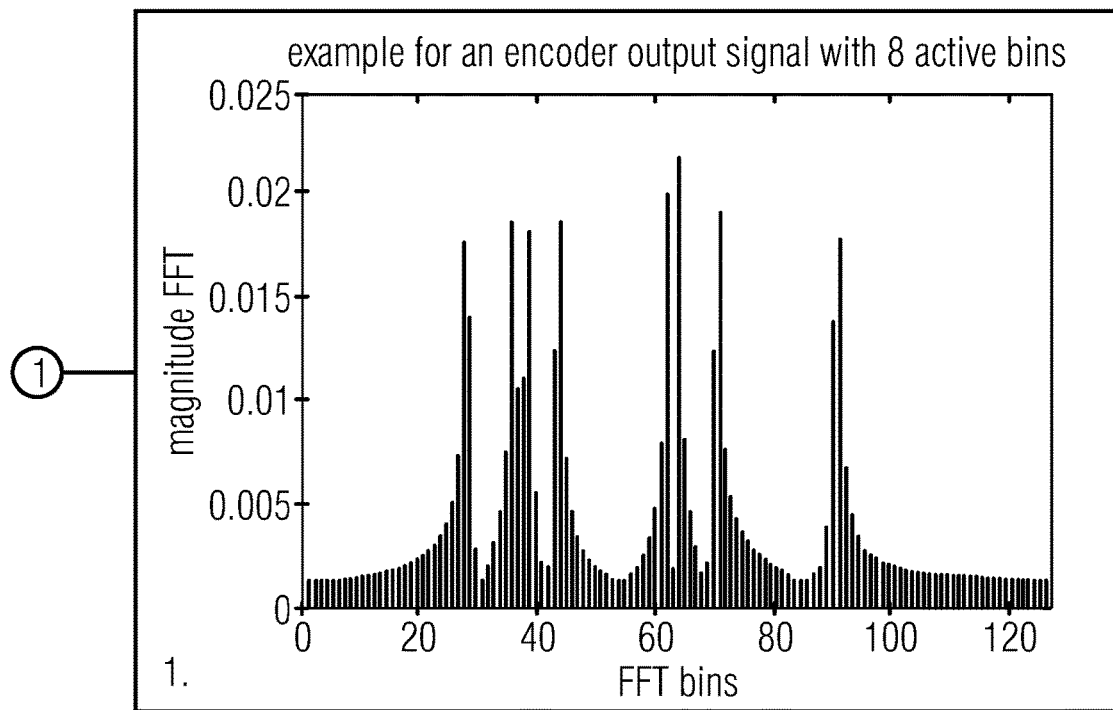
Figure 16B:
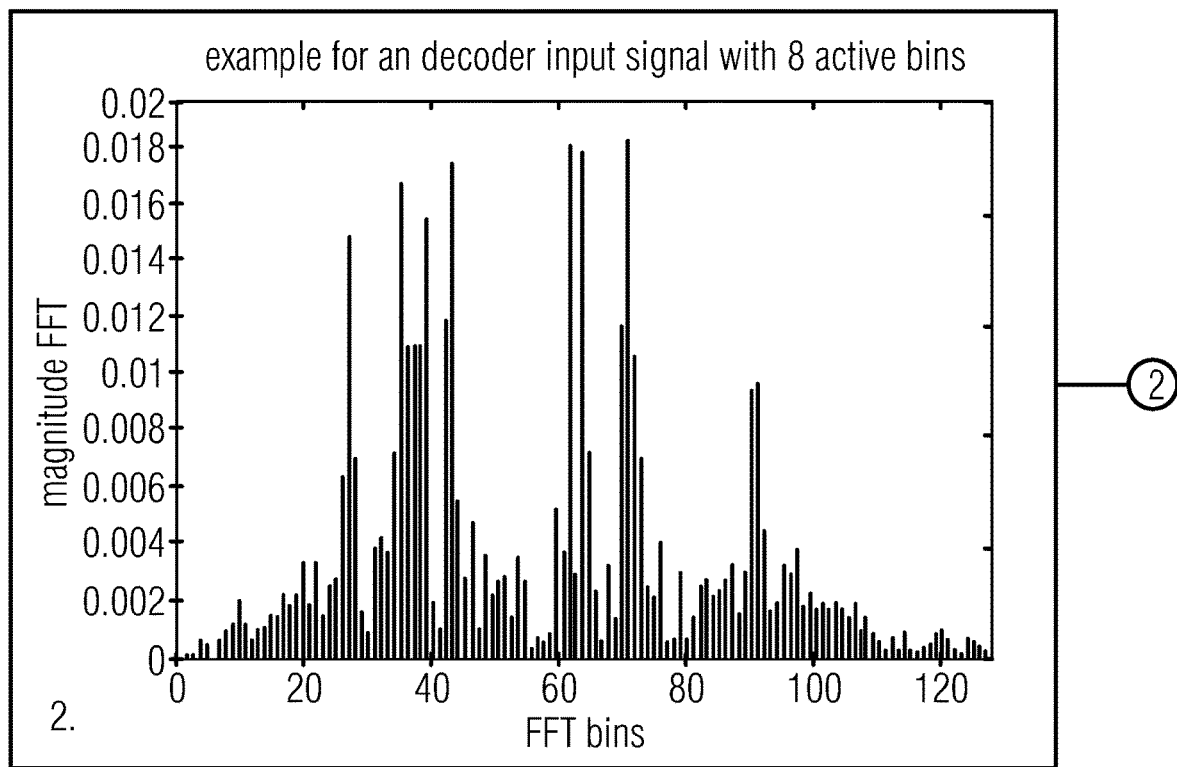

In FIG. 13 the location ①at the output of the encoder 1306, the location ②at the input of the decoder 1310, and the location ③at the output of the decoder 1310 are indicated, and FIG. 15 and FIG. 16 are graphs of the respective signal at the locations ①, ②and ③.

In the above-described embodiments, it has been mentioned that the frequencies of the frequency spectrum to be used should correspond to integer multiples of the frequency resolution so that the respective sampling points lie on the grid. FIG. 15 illustrates examples of the respective signal at the locations ①, ②and ③in FIG. 13 when employing a carrier frequency which is an integer multiple of the frequency resolution. FIG. 15(*a*) illustrates the encoder output signal with eight active bins and FIG. 15(*b*) illustrates the decoder input signal with eight active bins. FIG. 15(*c*) illustrates the decoder output signal with eight active bins. In FIG. 15(*c*) illustrates an output signal which includes multiple transmissions, i.e., multiple status words are present, and for the described example, the center part of FIG. 15(*c*) is of interest illustrating the relevant part of the spectrum (the spectrum associated with the extended bit word 1304), and FIG. 15(*d*) is an enlarged view of the center part of FIG. 15(*c*).

FIG. 15(*a*) and FIG. 15(*b*) illustrate the spectra of an audio signal or real signal having, in the depicted example a length of 256 samples with a sampling rate of 8 kHz. This is one frame encoding the information with the needed synchronization. The frequency resolution is 8000 Hz/256=31.25 Hz. FIG. 15(*c*) and FIG. 15(*d*) illustrate the output after the FFT of the OFDM decoder. From FIG. 15(*d*) the extended bitstream having the defined number of ones is directly retrievable. In the example of FIG. 15 the carrier frequency is an integer multiple of the frequency resolution. It is noted that the spectrum in FIG. 15(*d*) is a mirrored version of the spectra in FIG. 15(*a*) and FIG. 15(*b*), i.e., the order of the peaks is reversed or mirrored.

The inventive approach is not limited to the above-described embodiments, in which the frequencies of the frequency spectrum to be used to integer multiples of the frequency resolution. Actually, dependent on the implementation of the encoding/decoding process, the respective frequencies occurring in the frequency spectrum generated in the OFDM encoder 1306, may not be a multiple integer of a frequency resolution, i.e., they may be off grid.

FIG. 16 illustrates examples of the respective signal at the locations ①, ②and ③in FIG. 13 when employing a carrier frequency which is not an integer multiple of the frequency resolution. FIG. 16(*a*) illustrates the encoder output signal with eight active bins and FIG. 16(*b*) illustrates the decoder input signal with eight active bins. FIG. 16(*c*) illustrates the decoder output signal with eight active bins. In FIG. 16(*c*) illustrates an output signal which includes multiple transmissions, i.e., multiple status words are present, and for the described example, the center part of FIG. 16(*c*) is of interest illustrating the relevant part of the spectrum (the spectrum associated with the extended bit word 1304), and FIG. 16(*d*) is an enlarged view of the center part of FIG. 16(*c*).

FIG. 16(*a*) and FIG. 16(*b*) illustrate the spectra of an audio signal or real signal having, in the depicted example a length of 256 samples with a sampling rate of 8 kHz. This is one frame encoding the information with the needed synchronization. The frequency resolution is 8000 Hz/256=31.25 Hz. FIG. 16(*c*) and FIG. 16(*d*) illustrate the output after the FFT of the OFDM decoder. From FIG. 16(*d*) the extended bitstream having the defined number of ones is directly retrievable. In the example of FIG. 16 the carrier frequency is not an integer multiple of the frequency resolution so that the peaks can be detected only once the audio signal has passed the demodulator of the OFDM decoder as is indicated in FIG. 16(*c*) and FIG. 16(*d*). It is noted that the spectrum in FIG. 16(*d*), like in FIG. 15(*d*), is a mirrored version of the spectra in FIG. 16(*a*) and FIG. 16(*b*), i.e., the order of the peaks is reversed or mirrored.

In some of the above-described embodiments, reference has been made to a cellular mobile communication system, like a 2G, 3G, 4G/VoLTE and 5G system, however, the present invention is not limited to such embodiments. Rather, any mobile or wireless connection that provides for a voice communication using a voice or communication channel may be employed for implementing the inventive approach described herein. The communication or voice channel may be any channel used to wirelessly convey an information signal, for example a digital bit stream, from one or several senders to one or several receivers. In accordance with embodiments, the channel may a radio channel employing radio waves transmitted through air and/or water. The channel may be the voice or acoustic channel of an analog or digital radio system, e.g., a system using radiotelephones or satellite phones, such as radiophones used by emergency services, like police, ambulances or fire fighters.

In accordance with other embodiments, rather than radio waves, the channel may a channel employing other waves, like acoustic waves, e.g., ultrasonic waves for a transmission in water.

As mentioned above, the inventive approach employs the voice channel of a wireless communication system for transmitting the control information so that, in accordance with embodiments, the characteristic of such a voice channel that voice may be transmitted simultaneously in both directions (full duplex characteristic) may be employed to simultaneously send control information to the device and receive data from the device. For example, sensor data like position and height of the device may be transmitted in real time from a drone to a base. This is advantageous as it allows extending the range of mobile devices well beyond the line of sight between the base and the device. For example, the received data may be used to provide a virtual view of the device in its environment. In accordance with other embodiments visual or audio information may be transmitted from the device to the base, e.g., in compressed form. In accordance with yet other embodiments, in case the device is equipped with one or more sensors and/or actuators, the device may return to the base data obtained by the sensor or data about the sensor or actuator. The possibility to transmit data from the device to the base may depend on or may be limited by the bandwidth of the voice channel.

In some of the above-described embodiments, reference has been made to a drone or UAV as the device to be controlled, however, the present invention is not limited to such embodiments. Rather, any remote device may be controlled, e.g., a ground based vessel or a maritime vessel, like a vehicle, a surface vessel or a submarine.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. Units or modules as well as the steps of the methods performed by these units may execute on one or more computer systems. The computer system may include one or more processors, like a special purpose or a general purpose digital signal processor. The processor may be connected to a communication infrastructure, like a bus or a network. The computer system may include a main memory, e.g., a random access memory (RAM), and a secondary memory, e.g., a hard disk drive and/or a removable storage drive. The secondary memory may allow computer programs or other instructions to be loaded into the computer system. The computer system may further include a communications interface to allow software and data to be transferred between computer system and external devices. The communication may be in the form electronic, electro-magnetic, optical, or other signals capable of being handled by a communications interface. The communication may use a wire or a cable, fiber optics, a phone line, a cellular phone link, an RF link and other communications channels.

The terms "computer program medium" and "computer readable medium" are used to generally refer to tangible storage media such as removable storage units or a hard disk installed in a hard disk drive. These computer program products are means for providing software to a computer system, such as the computer system described before. The computer programs, also referred to as computer control logic, are stored in main memory and/or secondary memory. Computer programs may also be received via the communications interface. The computer program, when executed, enable the computer system to implement the present invention. In particular, the computer program, when executed, enable processor to implement the processes of the present invention, such as any of the methods described herein. Accordingly, such a computer program may represent a controller of the computer system. Where the disclosure is implemented using software, the software may be stored in a computer program product and loaded into computer system using a removable storage drive, an interface, like communications interface.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention may comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods may comprise, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A method for providing control signals for a transmission from a transmitting device to a receiving device using a mobile communication connection between the transmitting device and the receiving device, wherein the mobile communication connection comprises a voice channel, the method comprising:

providing user data, at the transmitting device, the user data comprising the control signals, the control signals being used for controlling an operation of the receiving device; and mapping, at the transmitting device, the user data on a predetermined number of frequencies of a frequency spectrum of the voice channel of the mobile communication connection, wherein the user data comprises a plurality of data elements, and the mapping of the user data comprises assigning each data element to a unique combination of frequencies, and wherein the assigning of each data element to the unique combination of frequencies causes each data element to be represented by a unique discrete frequency spectrum having a plurality of grid points, the unique discrete frequency spectrum comprising peaks at a subset of the plurality of grid points and zeros at the remaining grid points.

2. The method of claim 1, wherein the frequencies of the frequency spectrum correspond to integer multiples of a base frequency.

3. The method of claim 1, wherein the predetermined number of frequencies comprising a subset of frequencies, the subset of frequencies comprising at least one frequency up to a maximum number of available frequencies.

4. The method of claim 3, wherein the maximum number of available frequencies is smaller than an integer number corresponding to a quotient of a frequency range of the voice channel divided by a base frequency.

5. The method of claim 1, wherein the assigning of each data element to the unique combination of frequencies is based on a codebook.

6. The method of claim 1, the method further comprising:
transmitting the frequency spectrum from the transmitting device to the receiving device.

7. The method of claim 6, wherein the transmitting comprises:
repeatedly or continuously transmitting a same frequency spectrum until a change of the user data occurs.

8. The method of claim 1, wherein the mapping of the user data on the predetermined number of frequencies of the frequency spectrum of the voice channel of the mobile communication connection comprises:
representing the user data by a bit word, wherein for each of the plurality of user data elements a unique bit word is provided, the unique bit word comprising a same predefined number of ones, and
extending the bit word to an extended bit word so as to acquire the extended bit word comprising a length corresponding to an input word length for an OFDM-encoder.

9. The method of claim 8, wherein the same predefined number of ones is substantially less than a number of zeros, and is between three and ten.

10. The method of claim 1, comprising:
transmitting data from the receiving device to the transmitting device.

11. The method of claim 1, wherein the voice channel provides for a simultaneous transmission in both directions, and wherein data is transmitted simultaneously from the transmitting device to the receiving device and from the receiving device to the transmitting device.

12. A method for controlling an operation of a receiving device via a mobile communication connection between a transmitting device and the receiving device, the mobile communication connection comprising a voice channel, the method comprising:
receiving, at the receiving device, a frequency spectrum, the frequency spectrum comprising a predetermined number of frequencies of a frequency spectrum of the voice channel of the mobile communication connection, wherein user data comprising control signals for controlling the operation of the receiving device is mapped to the predetermined number of frequencies;
performing, at the receiving device, a demapping of the received frequency spectrum to acquire the control signals; and
controlling the receiving device based on the acquired control signals,
wherein the user data comprises a plurality of data elements, and the mapping of the user data comprises assigning each data element to a unique combination of frequencies, and
wherein the assigning of each data element to the unique combination of frequencies causes each data element to be represented by a unique discrete frequency spectrum having a plurality of grid points, the unique discrete frequency spectrum comprising peaks at a subset of the plurality of grid points and zeros at the remaining grid points.

13. The method of claim 12, wherein the receiving device comprises a codebook adapted to assign the unique combinations of frequencies to the respective control signals.

14. The method of claim 12, wherein the frequency spectrum is received as a frame, the method further comprising:
discarding the frame in case that the number of frequencies in the frame is not equal to a predetermined number of frequencies.

15. The method of claim 12, wherein the performing of the demapping comprises:
performing, at the receiving device, a Fourier transform (FT) on the frequency spectrum to acquire a FT spectrum; and
extracting, at the receiving device, amplitudes of peaks of the FT spectrum at frequencies that correspond to integer multiples of a base frequency.

16. The method of claim 15, further comprising:
translating, at the receiving device, the frequencies of the extracted amplitudes into the control signals using a codebook.

17. The method of claim 15, wherein the base frequency corresponds to a frequency resolution of the FT.

18. The method of claim 12, wherein the demapping of the received frequency spectrum comprises:
acquiring by an OFDM decoder, using the received frequency spectrum, an extended bit word; and
reducing the extended bit word so as to acquire a bit word representing the user data, wherein for each of the plurality of user data element a unique bit word is provided, the unique bit word for each of the plurality of user data element comprising a same predefined number of ones.

19. The method of claim 18, wherein the same predefined number of ones is substantially less than a number of zeros, and is between three and ten.

20. A method for a control system, the control system comprising a transmitting device, a receiving device and a mobile communication connection between the transmitting device and the receiving device, the method comprising:

providing control signals from the transmitting device to the receiving device according to a method for providing the control signals for a transmission from the transmitting device to the receiving device using the mobile communication connection between the transmitting device and the receiving device, wherein the mobile communication connection comprises a voice channel, the method for providing the control signals comprising:
  providing user data, at the transmitting device, the user data comprising the control signals, the control signals being used for controlling an operation of the receiving device; and
  mapping, at the transmitting device, the user data on a predetermined number of frequencies of a frequency spectrum of the voice channel of the mobile communication connection,
  wherein the user data comprises a plurality of data elements, and the mapping of the user data comprises assigning each data element to a unique combination of frequencies,
  wherein the assigning of each data element to the unique combination of frequencies causes each data element to be represented by a unique discrete frequency spectrum having a plurality of grid points, the unique discrete frequency spectrum comprising peaks at a sub-set of the plurality of grid points and zeros at the remaining grid points; and
controlling the operation of the receiving device according to a method for controlling the operation of the receiving device via the mobile communication connection between the transmitting device and the receiving device, the mobile communication connection comprising the voice channel, the method for controlling the operation of the receiving device comprising:
  receiving, at the receiving device, a frequency spectrum, the frequency spectrum comprising a predetermined number of frequencies of the frequency spectrum of the voice channel of the mobile communication connection, wherein the control signals for controlling the operation of the receiving device are mapped to the predetermined number of frequencies;
  performing, at the receiving device, a demapping of the received frequency spectrum to acquire the control signals; and
  controlling the receiving device based on the acquired control signals.

21. The method of claim 20, comprising:
transmitting data from the receiving device to the transmitting device.

22. The method of claim 20, wherein the voice channel provides for a simultaneous transmission in both directions, and wherein data is transmitted simultaneously from the transmitting device to the receiving device and from the receiving device to the transmitting device.

23. A non-transitory digital storage medium having a computer program stored thereon to perform, when said computer program is run by a computer, a method for providing control signals for a transmission from a transmitting device to a receiving device using a mobile communication connection between the transmitting device and the receiving device, wherein the mobile communication connection comprises a voice channel, the method comprising:
  providing user data, at the transmitting device, the user data comprising the control signals, the control signals being used for controlling an operation of the receiving device; and
  mapping, at the transmitting device, the user data on a predetermined number of frequencies of a frequency spectrum of the voice channel of the mobile communication connection,
  wherein the user data comprises a plurality of data elements, and the mapping of the user data comprises assigning each data element to a unique combination of frequencies,
  wherein the assigning of each data element to the unique combination of frequencies causes each data element to be represented by a unique discrete frequency spectrum having a plurality of grid points, the unique discrete frequency spectrum comprising peaks at a subset of the plurality of grid points and zeros at the remaining grid points.

24. A transmitting device for providing control signals for a transmission from the transmitting device to a receiving device using a mobile communication connection between the transmitting device and the receiving device, the mobile communication connection comprising a voice channel, the transmitting device comprising:
  a controller adapted to provide user data, the user data comprising the control signals, the control signals being used for controlling an operation of the receiving device; and
  a mapper adapted to map the user data on a predetermined number of frequencies of a frequency spectrum of the voice channel of the mobile communication connection,
  wherein the user data comprises a plurality of data elements, and wherein the mapper assigns each data element to a unique combination of frequencies,
  wherein the assigning of each data element to the unique combination of frequencies causes each data element to be represented by a unique discrete frequency spectrum having a plurality of grid points, the unique discrete frequency spectrum comprising peaks at a subset of the plurality of grid points and zeros at the remaining grid points.

25. The transmitting device of claim 24, wherein the transmitting device is configured to receive data from the receiving device.

26. A receiving device configured for controlling an operation of the receiving device via a mobile communication connection between a transmitting device and the receiving device, the mobile communication connection comprising a voice channel, the receiving device comprising:
  a receiver adapted to receive a frequency spectrum, the frequency spectrum comprising a predetermined number of frequencies of a frequency spectrum of the voice channel of the mobile communication connection, wherein user data comprising control signals for controlling the operation of the receiving device is mapped to the predetermined number of frequencies;
  a demapper adapted to perform a demapping of the received frequency spectrum to acquire the control signals; and
  a controller adapted to control the receiving device based on the acquired control signals, wherein the user data comprises a plurality of data elements, and the mapping of the user data comprises assigning each data element to a unique combination of frequencies, and wherein the assigning of each data element to the unique combination of frequencies causes each data element to be represented by a unique discrete frequency spectrum having a plurality of grid points, the unique discrete frequency spectrum comprising peaks at a subset of the plurality of grid points and zeros at the remaining grid points.

27. The receiving device of claim 26, wherein the receiving device is configured to transmit data to the transmitting device.

28. A system comprising a transmitting device for providing control signals for a transmission from the transmitting device to a receiving device using a mobile communication connection between the transmitting device and the receiving device, the mobile communication connection comprising a voice channel, the transmitting device comprising:
- a controller adapted to provide user data, the user data comprising the control signals, the control signals being used for controlling an operation of the receiving device; and
- a mapper adapted to map the user data on a predetermined number of frequencies of a frequency spectrum of the voice channel of the mobile communication connection, wherein the user data comprises a plurality of data elements, and wherein the mapper assigns each data element to a unique combination of frequencies, wherein the assigning of each data element to the unique combination of frequencies causes each data element to be represented by a unique discrete frequency spectrum having a plurality of grid points, the unique discrete frequency spectrum comprising peaks at a sub-set of the plurality of grid points and zeros at the remaining grid points, wherein the receiving device is configured for controlling an operation of the receiving device via the mobile communication connection between the transmitting device and the receiving device, the mobile communication connection comprising the voice channel, the receiving device comprising:
- a receiver adapted to receive a frequency spectrum, the frequency spectrum comprising a predetermined number of frequencies of the frequency spectrum of the voice channel of the mobile communication connection, wherein the user data comprising the control signals for controlling the operation of the receiving device is mapped to the predetermined number of frequencies;
- a demapper adapted to perform a demapping of the received frequency spectrum to acquire the control signals; and
- a controller adapted to control the receiving device based on the acquired control signals.

\* \* \* \* \*